(12) United States Patent
Park et al.

(10) Patent No.: US 9,430,494 B2
(45) Date of Patent: Aug. 30, 2016

(54) SPATIAL DATA CARTRIDGE FOR EVENT PROCESSING SYSTEMS

(75) Inventors: Hoyong Park, San Jose, CA (US); Alexandre de Castro Alves, Santa Clara, CA (US); Unmesh Deshmukh, Nagpur (IN); Anand Srinivasan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 173 days.

(21) Appl. No.: 12/949,081

(22) Filed: Nov. 18, 2010

(65) Prior Publication Data
US 2011/0161328 A1   Jun. 30, 2011

Related U.S. Application Data

(60) Provisional application No. 61/355,415, filed on Jun. 16, 2010, provisional application No. 61/327,903, filed on Apr. 26, 2010, provisional application No. 61/311,175, filed on Mar. 5, 2010, provisional application No. 61/290,460, filed on Dec. 28, 2009.

(51) Int. Cl.
*G06F 17/30* (2006.01)

(52) U.S. Cl.
CPC ... *G06F 17/30241* (2013.01); *G06F 17/30516* (2013.01)

(58) Field of Classification Search
CPC .......... G06F 3/0674; G06F 17/30241; G06F 17/30516
USPC ........................................................ 707/743
See application file for complete search history.

(56) References Cited

U.S. PATENT DOCUMENTS

| | | | |
|---|---|---|---|
| 4,996,687 | A | 2/1991 | Hess et al. |
| 5,051,947 | A | 9/1991 | Messenger et al. |

(Continued)

FOREIGN PATENT DOCUMENTS

| | | |
|---|---|---|
| CN | 104885077 | 9/2015 |
| CN | 104937591 | 9/2015 |

(Continued)

OTHER PUBLICATIONS

Hao et al. "Achieving high performance web applications by service and database replications at edge servers," proceedings of IPCCC 2009, IEEE 28th International Performance Computing and Communications Conference, pp. 153-160 (Dec. 2009).

(Continued)

*Primary Examiner* — Jorge A Casanova
(74) *Attorney, Agent, or Firm* — Kilpatrick Townsend and Stockton LLP

(57) ABSTRACT

Techniques for extending the capabilities of an event processing system to support the processing of spatial data. In one set of embodiments, this extensibility can be provided via a plug-in extension component referred to herein as a spatial data cartridge. The spatial data cartridge can enable the event processing system to support spatial data types (e.g., point, polygon, etc.) and various operations related to such data types (e.g., proximity determinations, overlap determinations, etc.). The spatial data cartridge can also define an indexing scheme that can be integrated with the capabilities of the event processing system to support the indexing of spatial data. Using the spatial data cartridge, the event processing system can operate on spatial data even if spatial data formats are not natively supported by the system.

7 Claims, 8 Drawing Sheets

(56) References Cited

U.S. PATENT DOCUMENTS

| | | | |
|---|---|---|---|
| 5,339,392 A | 8/1994 | Risberg et al. |
| 5,495,600 A | 2/1996 | Terry et al. |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | DeMichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,985,904 B1 | 1/2006 | Kaluskar et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,348,981 B1 | 3/2008 | Buck |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,475,058 B2 * | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,533,087 B2 | 5/2009 | Liu et al. |
| 7,546,284 B1 | 6/2009 | Martinez et al. |
| 7,552,365 B1 | 6/2009 | March et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,613,848 B2 | 11/2009 | Amini et al. |
| 7,620,851 B1 | 11/2009 | Leavy et al. |
| 7,630,982 B2 | 12/2009 | Boyce |
| 7,634,501 B2 | 12/2009 | Yabloko |
| 7,636,703 B2 | 12/2009 | Taylor |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chikodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | MacLennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,984,043 B1 | 7/2011 | Waas |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,134,184 B2 | 3/2012 | Becker et al. |
| 8,155,880 B2 | 4/2012 | Patel et al. |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,346,511 B2 | 1/2013 | Schoning et al. |
| 8,370,812 B2 | 2/2013 | Feblowitz et al. |
| 8,396,886 B1 | 3/2013 | Tsimelzon |
| 8,447,739 B2 | 5/2013 | Naibo et al. |
| 8,458,175 B2 | 6/2013 | Stokes |
| 8,521,867 B2 | 8/2013 | Srinivasan et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,676,841 B2 | 3/2014 | Srinivasan et al. |
| 8,713,049 B2 | 4/2014 | Jain et al. |

(56) References Cited

U.S. PATENT DOCUMENTS

| | | |
|---|---|---|
| 8,719,207 B2 | 5/2014 | Ratnam et al. |
| 8,745,070 B2 | 6/2014 | Krishnamurthy |
| 8,762,369 B2 | 6/2014 | Macho et al. |
| 8,775,412 B2 | 7/2014 | Day et al. |
| 9,047,249 B2 | 6/2015 | de Castro Alves et al. |
| 9,058,360 B2 | 6/2015 | De Castro Alves et al. |
| 9,098,587 B2 | 8/2015 | Deshmukh et al. |
| 9,110,945 B2 | 8/2015 | Jain |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 2002/0023211 A1 | 2/2002 | Roth et al. |
| 2002/0032804 A1 | 3/2002 | Hunt |
| 2002/0038306 A1 | 3/2002 | Griffin et al. |
| 2002/0038313 A1 | 3/2002 | Klein et al. |
| 2002/0049788 A1 | 4/2002 | Lipkin et al. |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-Mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0212664 A1 | 11/2003 | Breining et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1* | 1/2004 | Crabtree ................... 707/3 |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1* | 7/2004 | Le Leannec et al. ........ 382/232 |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0108368 A1 | 5/2005 | Mohan |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0167704 A1 | 7/2006 | Nicholls et al. |
| 2006/0167856 A1 | 7/2006 | Angele et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1* | 3/2007 | von Kaenel et al. ............ 707/3 |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0192301 A1 | 8/2007 | Posner |
| 2007/0198479 A1 | 8/2007 | Cai et al. |
| 2007/0214171 A1 | 9/2007 | Behnen |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |

(56) References Cited

U.S. PATENT DOCUMENTS

| | | |
|---|---|---|
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennet et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106946 A1 | 4/2010 | Imaki et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen et al. |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0040746 A1 | 2/2011 | Handa et al. |
| 2011/0055192 A1 | 3/2011 | Tang et al. |
| 2011/0055197 A1 | 3/2011 | Chavan |
| 2011/0093162 A1 | 4/2011 | Nielsen et al. |
| 2011/0105857 A1 | 5/2011 | Zhang et al. |
| 2011/0161321 A1 | 6/2011 | de Castro Alves et al. |
| 2011/0161328 A1 | 6/2011 | Park et al. |
| 2011/0161352 A1 | 6/2011 | de Castro Alves et al. |
| 2011/0161356 A1 | 6/2011 | de Castro Alves et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | de Castro Alves et al. |
| 2011/0246445 A1 | 10/2011 | Mishra |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0290715 A1 | 11/2012 | Dinger et al. |
| 2012/0324453 A1 | 12/2012 | Chandramouli et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0332240 A1 | 12/2013 | Patri et al. |
| 2014/0082013 A1 | 3/2014 | Wolf et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0358959 A1 | 12/2014 | Bishnoi et al. |
| 2014/0379712 A1 | 12/2014 | Lafuente Alvarez |
| 2015/0156241 A1 | 6/2015 | Shukla et al. |
| 2015/0161214 A1 | 6/2015 | Kali et al. |
| 2015/0227415 A1 | 8/2015 | Alves et al. |
| 2015/0363464 A1 | 12/2015 | Alves et al. |
| 2015/0381712 A1 | 12/2015 | De Castro Alves et al. |
| 2016/0034311 A1 | 2/2016 | Park et al. |

FOREIGN PATENT DOCUMENTS

| | | |
|---|---|---|
| EP | 1241589 A2 | 9/2002 |
| EP | 2474922 | 7/2012 |
| EP | 2946314 | 11/2015 |
| EP | 2946527 | 11/2015 |

(56) References Cited

FOREIGN PATENT DOCUMENTS

| EP | 2959408 | 12/2015 |
|---|---|---|
| JP | 2015536001 | 12/2015 |
| JP | 2016500167 | 1/2016 |
| WO | WO00/49533 | 8/2000 |
| WO | WO 00/49533 A2 | 8/2000 |
| WO | 0118712 | 3/2001 |
| WO | WO 01/59602 A2 | 8/2001 |
| WO | WO 01/65418 A2 | 9/2001 |
| WO | WO 03/030031 A2 | 4/2003 |
| WO | 2007122347 | 11/2007 |
| WO | 2012050582 | 4/2012 |
| WO | 2015191120 | 12/2015 |

OTHER PUBLICATIONS

International Search Report dated for PCT/US2011/052019 (Nov. 17, 2011).
Office Action for U.S. Appl. No. 12/396,008 (Nov. 16, 2011).
Office Action for U.S. Appl. No. 12/506,891 (Dec. 14, 2011).
Office Action for U.S. Appl. No. 12/534,398 (Nov. 11, 2011).
Office Action for U.S. Appl. No. 11/601,415 (Dec. 9, 2011).
Abadi, et al., "Aurora: A Data Stream Management System," International Conference on Management of Data, Proceedings of the 2003 ACM SIGMOD International Conference on Management of Data, ACM Press, 2003, 4 pages.
Aho, et al., "Efficient String Matching: An Aid to Bibliographic Search," Communications of the ACM, Jun. 1975, vol. 18, No. 6, pp. 333-340, Copyright 1975, Association for Computing Machinery, Inc.
Arasu, "CQL: A language for Continuous Queries over Streams and Relations," Lecture Notes in Computer Science, 2004, vol. 2921/2004, pp. 1-19.
Arasu, et al., "The CQL Continuous Query Language: Semantic Foundations and Query Execution," Stanford University, The VLDB Journal—The International Journal on Very Large Data Bases, Jun. 2006, vol. 15, issue 2, pp. 1-32, Springer-Verlag New York, Inc.
Arasu, et al., "An Abstract Semantics and Concrete Language for Continuous Queries over Streams and Relations," 9th International Workshop on Database programming languages, Sep. 2003, 11 pages.
Arasu, et al., "STREAM: The Stanford Data Stream Management System," Department of Computer Science, Stanford University, 2004, p. 21.
Avnur, et al., "Eddies: Continuously Adaptive Query Processing," In Proceedings of the 2000 ACM SIGMOD International Conference on Data, Dallas TX, May 2000, 12 pages.
Avnur, et al., "Eddies: Continuously Adaptive Query Processing," slide show, believed to be prior to Oct. 17, 2007, 4 pages.
Babu, et al., "Continuous Queries over Data Streams," SIGMOD Record, Sep. 2001, vol. 30, No. 3, pp. 109-120.
Bai, et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, Copyright 2006, ACM Press.
Bose, et al., "A Query Algebra for Fragmented XML Stream Data", 9th International Conference on Data Base Programming Languages (DBPL), Sep. 6-8, 2003, Potsdam, Germany, at URL: http://lambda,uta.edu/dbp103.pdf, 11 pages.
Buza, "Extension of CQL over Dynamic Databases," Journal of Universal Computer Science, 2006, vol. 12, No. 9, pp. 1165-1176.
Carpenter, "User Defined Functions," Oct. 12, 2000, at URL: http://www.sqlteam.com/itemprint.asp?ItemID=979, 4 pages.
Chan, et al., "Efficient Filtering of XML documents with Xpath expressions," VLDB Journal, 2002, pp. 354-379.
Chandrasekaran, et al., "TelegraphCQ: Continuous Dataflow Processing for an Uncertain World," Proceedings of CIDR 2003, 12 pages.

Chen, et al., "NiagaraCQ: A Scalable Continuous Query System for Internet Databases," Proceedings of the 2000 SIGMOD International Conference on Management of Data, May 2000, pp. 379-390.
Colyer, et al., "Spring Dynamic Modules Reference Guide," Copyright 2006-2008, ver. 1.0.3, 73 pages.
Colyer, et al., "Spring Dynamic Modules Reference Guide," Copyright 2006-2008, ver. 1.1.3, 96 pages.
"Complex Event Processing in the Real World," an Oracle White Paper, Sep. 2007, 13 pages.
Conway, "An Introduction to Data Stream Query Processing," Truviso, Inc., May 24, 2007, at URL: http://neilconway.org/talks/stream_intro.pdf, 71 pages.
"Coral8 Complex Event Processing Technology Overview," Coral8, Inc., Make it Continuous, pp. 1-8, Copyright 2007, Coral8, Inc.
"Creating WebLogic Domains Using the Configuration Wizard," BEA Products, Dec. 2007, ver. 10.0, 78 pages.
"Creating Weblogic Event Server Applications," BEA WebLogic Event Server, Jul. 2007, ver. 2.0, 90 pages.
Demers, et al., "Towards Expressive Publish/Subscribe Systems," Proceedings of the 10th International Conference on Extending Database Technology (EDBT 2006), Munich, Germany, Mar. 2006, pp. 1-18.
DeMichiel, et al., "JSR 220: Enterprise JavaBeans™, EJB 3.0 Simplified API," EJB 3.0 Expert Group, Sun Microsystems, May 2, 2006, ver. 3.0, 59 pages.
"Dependency Injection," Wikipedia, Dec. 30, 2008, printed on Apr. 29, 2011, at URL: http:en.wikipedia.org/w/index.php?title=Dependency_injection&oldid=260831402, pp. 1-7.
"Deploying Applications to WebLogic Server," BEA WebLogic Server, Mar. 30, 2007, ver. 10.0, 164 pages.
Deshpande, et al., "Adaptive Query Processing," slide show believed to be prior to Oct. 17, 2007, 27 pages.
"Developing Applications with Weblogic Server," BEA WebLogic Server, Mar. 30, 2007, ver. 10.0, 254 pages.
Diao, "Query Processing for Large-Scale XML Message Brokering," 2005, University of California Berkeley, 226 pages.
Diao, et al. "Query Processing for High-Volume XML Message Brokering", Proceedings of the 29th VLDB Conference, Berlin, Germany, 2003, 12 pages.
Dindar, et al., "Event Processing Support for Cross-Reality Environments," Pervasive Computing, IEEE CS, Jul.-Sep. 2009, pp. 2-9, Copyright 2009, IEEE.
"EPL Reference," BEA WebLogic Event Server, Jul. 2007, ver. 2.0, 82 pages.
Esper Reference Documentation, Copyright 2007, ver. 1.12.0, 158 pages.
Esper Reference Documentation, Copyright 2008, ver. 2.0.0, 202 pages.
"Fast Track Deployment and Administrator Guide for BEA WebLogic Server," BEA WebLogic Server 10.0 Documentation, printed on May 10, 2010, at URL: http://download.oracle.com/docs/cd/E13222_01/wls/docs100/quickstart/quick_start.html, 1 page.
Fernandez, et al., "Build your own XQuery processor", slide show, at URL: http://www.galaxquery.org/slides/edbt-summer-school2004.pdf, 2004, 116 pages.
Fernandez, et al., Implementing XQuery 1.0: The Galax Experience:, Proceedings of the 29th VLDB Conference, Berlin, Germany, 2003, 4 pages.
Florescu, et al., "The BEA/XQRL Streaming XQuery Processor," Proceedings of the 29th VLDB Conference, 2003, Berlin, Germany, 12 pages.
"Getting Started with WebLogic Event Server," BEA WebLogic Event Server, Jul. 2007, ver. 2.0, 66 pages.
Gilani, "Design and implementation of stream operators, query instantiator and stream buffer manager," Dec. 2003, 137 pages.
Golab, "Sliding Window Query Processing Over Data Streams," University of Waterloo, Waterloo, Ont. Canada, Aug. 2006, 182 pages.
Golab, et al., "Issues in Data Stream Management," ACM SIGMOD Record, vol. 32, issue 2, Jun. 2003, ACM Press, pp. 5-14.
Gosling, et al., "The Java Language Specification," Book, copyright 1996-2005, 3rd edition, 684 pages, Sun Microsystems USA. (due to size, reference will be uploaded in two parts).

(56) References Cited

OTHER PUBLICATIONS

Hopcroft, "Introduction to Automata Theory, Languages, and Computation," Second Edition, Addison-Wesley, Copyright 2001, 524 pages. (due to size, reference will be uploaded in two parts).
"Installing Weblogic Real Time," BEA WebLogic Real Time, Jul. 2007, ver. 2.0, 64 pages.
"Introduction to BEA WebLogic Server and BEA WebLogic Express," BEA WebLogic Server, Mar. 2007, ver. 10.0, 34 pages.
"Introduction to WebLogic Real Time," BEA WebLogic Real Time, Jul. 2007, ver. 2.0, 20 pages.
"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.
Jin, et al. "ARGUS: Efficient Scalable Continuous Query Optimization for Large-Volume Data Streams" 10th International Database Engineering and Applications Symposium (IDEAS'06), 2006, 7 pages.
Kawaguchi, "Java Architecture for XML Binding _(JAXB) 2.0," Sun Microsystems, Inc., Apr. 19, 2006, 384 pages.
Knuth, et al., "Fast Pattern Matching in Strings," Siam J. Comput., vol. 6, No. 2, Jun. 1977, pp. 323-350.
Lakshmanan, et al., "On efficient matching of streaming XML documents and queries," 2002, 18 pages.
Lindholm, et al., "Java Virtual Machine Specification, 2nd Edition", Prentice Hall, Apr. 1999, 484 pages. (due to size, reference will be uploaded in two parts).
Liu, et al., "Efficient XSLT Processing in Relational Database System," Proceeding of the 32nd. International Conference on Very Large Data Bases (VLDB), Sep. 2006, 1106-1116, 11 pages.
Luckham, "What's the Difference Between ESP and CEP?" Complex Event Processing, downloaded Apr. 29, 2011, at URL: http://complexevents.com/?p=103, 5 pages.
Madden, et al., "Continuously Adaptive Continuous Queries (CACQ) over Streams," SIGMOD 2002, Jun. 4-6, 2002, 12 pages.
"Managing Server Startup and Shutdown," BEA WebLogic Server, Mar. 30, 2007, ver. 10.0, 134 pages.
"Matching Behavior," .NET Framework Developer's Guide, Copyright 2008 Microsoft Corporation, downloaded Jul. 1, 2008 from URL: http://msdn.microsoft.com/en-us/library/0yzc2yb0(printer).aspx, pp. 1-2.
Motwani, et al., "Models and Issues in Data Streams," Proceedings of the 21st ACM SIGMOD-SIGACT-SIDART symposium on Principles of database systems, 2002, 30 pages.
Motwani, et al., "Query Processing Resource Management, and Approximation in a Data Stream Management System," Proceedings of CIDR 2003, Jan. 2003, 12 pages.
Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.
"New Project Proposal for Row Pattern Recognition—Amendment to SQL with Application to Streaming Data Queries," H2-2008-027, H2 Teleconference Meeting, Jan. 9, 2008, pp. 1-6.
Novick, "Creating a User Defined Aggregate with SQL Server 2005," at URL: http://novicksoftware.com/Articles/sql-2005-product-user-defined-aggregate.html, 2005, 6 pages.
Oracle Database, SQL Language Reference, 11g Release 1 (11.1), B28286-02, Sep. 2007, 1496 pages, Oracle.
Oracle Application Server 10g, Release 2 and 3, New Features Overview, An Oracle White Paper, Oct. 2005, 48 pages, Oracle.
Oracle Application Server, Administrator's Guide, 10g Release 3 (10.1.3.2.0), B32196-01, Jan. 2007, 376 pages, Oracle.
Oracle Application Server, Enterprise Deployment Guide, 10g Release 3 (10.1.3.2.0), B32125-02, Apr. 2007, 120 pages, Oracle.
Oracle Application Server, High Availability Guide, 10g Release 3 (10.1.3.2.0), B32201-01, Jan. 2007, 314 pages, Oracle.
"Oracle CEP Getting Started," Release 11gR1 (11.1.1) E14476-01, May 2009, 172 pages.
Oracle Database Data Cartridge Developer's Guide, B28425-03, 11g Release 1 (11.1), Oracle, Mar. 2008, 372 pages, Oracle.
Oracle Database, SQL Reference, 10g Release 1 (10.1), Part No. B10759-01, Dec. 2003, pp. 7-1 to 7-17; 7-287 to 7-290; 14-61 to 14-74. (due to size, reference will be uploaded in three parts).
"OSGI Service Platform Core Specification, The OSGI Alliance," Apr. 2007, ver. 4.1, release 4, 288 pages, OSGI Alliance.
Peng, et al., "Xpath Queries on Streaming Data," 2003, pp. 1-12, ACM Press.
Peterson, "Petri Net Theory and the Modeling of Systems", Prentice Hall, 1981, 301 pages.
PostgresSQL: Documentation: Manuals: PostgresSQL 8.2: Create Aggregate, believed to be prior to Apr. 21, 2007, 4 pages.
PostgresSQL: Documentation: Manuals: PostgresSQL 8.2: User-Defined Aggregates, believed to be prior to Apr. 21, 2007, 4 pages.
"Release Notes," BEA WebLogic Event Server, Jul. 2007, ver. 2.0, 8 pages.
Sadri, et al., "Expressing and Optimizing Sequence Queries in Database Systems," ACM Transactions on Database Systems, Jun. 2004, vol. 29, No. 2, pp. 282-318, ACM Press, Copyright 2004.
Sadtler, et al., "WebSphere Application Server Installation Problem Determination," Copyright 2007, pp. 1-48, IBM Corp.
Sharaf, et al., "Efficient Scheduling of Heterogeneous Continuous Queries," VLDB '06, Sep. 12-15, 2006, pp. 511-522.
Spring Dynamic Modules for OSGi Service Platforms product documentation, SpringSource, Jan. 2008, 71 pages.
"Stanford Stream Data Manager," at URL: http://infolab.stanford.edu/stream/, last modified Jan. 5, 2006, pp. 1-9.
Stolze, "User-defined Aggregate Functions in DB2 Universal Database," at URL: http://www.128.ibm.com/developerworks/db2/library/tacharticle/0309stolze/0309stolze.html, Sep. 11, 2003, 11 pages.
Stream Query Repository: Online Auctions (CQL Queries), at URL: http://www-db.stanford.edu/strem/sqr/cql/onauc.html, Dec. 2, 2002, 4 pages.
Stream Query Repository: Online Auctions, at URL: http://www-db.stanford.edu/stream/sqr/onauc.html#queryspecsend, Dec. 2, 2002, 2 pages.
"Stream: The Stanford Stream Data Manager," IEEE Data Engineering Bulletin, Mar. 2003, pp. 1-8.
Streambase 5.1 product documentation, Streambase Systems, copyright 2004-2010, 878 pages.
Terry, et al., "Continuous queries over append-only database," Proceedings of 1992 ACM SIGMOD, pp. 321-330.
"Understanding Domain Configuration," BEA WebLogic Server, Mar. 30, 2007, ver. 10.0, 38 pages.
Vajjhala, et al, "The Java™ Architecture for XML Binding (JAXB) 2.0," Sun Microsystems, Inc., Final Release Apr. 19, 2006, 384 pages.
W3C, "XML Path Language (Xpath)," W3C Recommendation, Nov. 16, 1999, ver. 1.0, at URL: http://www.w3.org/TR/xpath, 37 pages.
"WebLogic Event Server Administration and Configuration Guide," BEA WebLogic Event Server, Jul. 2007, ver. 2.0, 108 pages.
"WebLogic Event Server Reference," BEA WebLogic Event Server, Jul. 2007, ver. 2.0, 52 pages.
"Weblogic Server Performance and Tuning," BEA WebLogic Server, Mar. 30, 2007, ver. 10.0, 180 pages.
"WebSphere Application Server V6.1 Problem Determination: IBM Redpaper Collection," WebSphere Software, IBM/Redbooks, Dec. 2007, 634 pages.
White, et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.
Widom, et al., "CQL: A Language for Continuous Queries over Streams and Relations," believed to be prior to Oct. 17, 2007, 62 pages.
Widom, et al., "The Stanford Data Stream Management System," PowerPoint Presentation, believed to be prior to Oct. 17, 2007, 110 pages.
Zemke,"XML Query," Mar. 14, 2004, 29 pages.

(56) References Cited

OTHER PUBLICATIONS

De Castro Alves; et al, "Extensible Indexing Framework Using Data Cartridges," U.S. Appl. No. 12/913,636, filed Oct. 27, 2010.
Park, et al., "Spatial Data Cartridge for Event Processing Systems," U.S. Appl. No. 12/949,081, filed Nov. 18, 2010.
De Castro Alves; et al, "Extensibility Platform Using Data Cartridges," U.S. Appl. No. 12/957,194, filed Nov. 30, 2010.
De Castro Alves; et al, "Class Loading Using Java Data Cartridges," U.S. Appl. No. 13/089,556, filed Apr. 19, 2011.
De Castro Alves; et al, "Extensible Language Framework Using Data Cartridges," U.S. Appl. No. 12/957,201, filed Nov. 30, 2010.
Non-Final Office Action for U.S. Appl. No. 12/396,008, mailed on Jun. 8, 2011, 10 pages.
Non-Final Office Action for U.S. Appl. No. 12/395,871, mailed on May 27, 2011, 7 pages.
Non-Final Office Action for U.S. Appl. No. 11/874,202, mailed on Dec. 3, 2009, 20 pages.
Final Office Action for U.S. Appl. No. 11/874,202, mailed on Jun. 8, 2010, 200 pages.
Notice of Allowance for U.S. Appl. No. 11/874,202, mailed on Dec. 22, 2010, 29 pages.
Notice of Allowance for U.S. Appl. No. 11/874,202, mailed on Mar. 31, 2011, 12 pages.
Notice of Allowance for U.S. Appl. No. 11/874,850, mailed on Nov. 24, 2009, 17 pages.
Supplemental Notice of Allowance for U.S. Appl. No. 11/874,850, mailed on Dec. 11, 2009, 5 pages.
Supplemental Notice of Allowance for U.S. Appl. No. 11/874,850, mailed on Jan. 27, 2010, 11 pages.
Non-Final Office Action for U.S. Appl. No. 11/874,896, mailed on Dec. 8, 2009, 19 pages.
Final Office Action for U.S. Appl. No. 11/874,896, mailed on Jul. 23, 2010, 28 pages.
Non-Final Office Action for U.S. Appl. No. 11/874,896, mailed on Nov. 22, 2010, 25 pages.
Non-Final Office Action for U.S. Appl. No. 11/977,439, mailed on Apr. 13, 2010, 7 pages.
Notice of Allowance for U.S. Appl. No. 11/977,439, mailed on Aug. 18, 2010, 11 pages.
Supplemental Notice of Allowance for U.S. Appl. No. 11/977,439, mailed on Sep. 28, 2010, 6 pages.
Notice of Allowance for U.S. Appl. No. 11/977,439, mailed on Nov. 24, 2010, 8 pages.
Notice of Allowance for U.S. Appl. No. 11/977,439, mailed on Mar. 16, 2011, 10 pages.
Non-Final Office Action for U.S. Appl. No. 11/977,437, mailed on Oct. 13, 2009, 9 pages.
Final Office Action for U.S. Appl. No. 11/977,437, mailed on Apr. 8, 2010, 18 pages.
Notice of Allowance for U.S. Appl. No. 11/977,440, mailed on Oct. 7, 2009, 6 pages.
Office Action for U.S. Appl. No. 11/874,197, mailed on Nov. 10, 2009, 14 pages.
Final Office Action for U.S. Appl. No. 11/874,197, mailed on Jun. 29, 2010, 17 pages.
Non-Final Office Action for U.S. Appl. No. 11/874,197, mailed on Dec. 22, 2010, 22 pages.
Non-Final Office Action for U.S. Appl. No. 11/873,407, mailed on Nov. 13, 2009, 7 pages.
Final Office Action for U.S. Appl. No. 11/873,407, mailed on Apr. 26, 2010, 11 pages.
Notice of Allowance for U.S. Appl. No. 11/873,407, mailed on Nov. 10, 2010, 14 pages.
Notice of Allowance for U.S. Appl. No. 11/873,407, mailed on Mar. 7, 2011, 8 pages.
Non-Final Office Action for U.S. Appl. No. 11/601,415, mailed on Sep. 17, 2008, 10 pages.
Final Office Action for U.S. Appl. No. 11/601,415, mailed on May 27, 2009, 26 pages.
Advisory Action for U.S. Appl. No. 11/601,415, mailed on Aug. 18, 2009, 3 pages.
Non-Final Office Action for U.S. Appl. No. 11/601,415, mailed on Nov. 30, 2009, 32 pages.
Final Office Action for U.S. Appl. No. 11/601,415, mailed on Jun. 30, 2010, 45 pages.
Non-Final Office Action for U.S. Appl. No. 11/927,681, mailed on Mar. 24, 2011, 17 pages.
Non-Final Office Action for U.S. Appl. No. 11/927,683, mailed on Mar. 24, 2011, 13 pages.
Non-Final Office Action for U.S. Appl. No. 10/948,523, mailed on Jan. 22, 2007, 31 pages.
Final Office Action for U.S. Appl. No. 10/948,523, mailed on Jul. 6, 2007, 37 pages.
Non-Final Office Action for U.S. Appl. No. 10/948,523, mailed Dec. 11, 2007, 47 pages.
Notice of Allowance for U.S. Appl. No. 10/948,523, mailed on Jul. 8, 2008, 30 pages.
Supplemental Notice of Allowance for U.S. Appl. No. 10/948,523, mailed on Jul. 17, 2008, 4 pages.
Notice of Allowance for U.S. Appl. No. 10/948,523, mailed on Dec. 1, 2010, 17 pages.
International Search Report dated Sep. 12, 2012 for PCT/US2012/036353.
Office Action for U.S. Appl. No. 13/396,464 dated Sep. 7, 2012.
Office Action for U.S. Appl. No. 13/244,272 dated Oct. 14, 2012.
Notice of Allowance for U.S. Appl. No. 12/548,209 dated Oct. 24, 2012.
Nah et al. "A Cluster-Based THO-Structured Scalable Approach for Location Information Systems," The Ninth IEEE International Workshop on Object-Oriented Real-Time Dependable Systems (WORDS' 03), pp. 225-233 (Jan. 1, 2003).
Hulton et al. "Mining Time-Changing Data Streams," Proceedings of the Seventh ACM SIGKDD, pp. 10 (Aug. 2001).
Stump et al. (ed.) Proceedings of IJCAR '06 Workshop "PLPV '06: Programming Languages meets Program Verification," pp. 1-113 (Aug. 21, 2006).
Vijayalakshmi et al. "Processing location dependent continuous queries in distributed mobile databases using mobile agents," IET-UK International Conference on Information and Communication Technology in Electrical Sciences (ICTES 2007), pp. 1023-1030 (Dec. 22, 2007).
Wang et al. "Distributed Continuous Range Query Processing on Moving Objects," Proceedings of the 17th international Conference on Database and Expert Systems Applications (DEXA'06), Berlin, DE, pp. 655-665 (Jan. 1, 2006).
Wu et al."Dynamic Data Management for Location Based Services in Mobile Environments," IEEE Proceedings of the Seventh International Database Engineering and Applications Symposium 2003 Piscataway. NJ. USA., pp. 172-181 (Jul. 16, 2003).
"StreamBase New and Noteworthy," StreamBase, dated Jan. 12, 2010, 878 pages.
Non-Final Office Action for U.S. Appl. No. 12/548,187, mailed on Sep. 27, 2011, 19 pages.
Final Office Action for U.S. Appl. No. 12/395,871, mailed on Oct. 19, 2011, 33 pages.
Non-Final Office Action for U.S. Appl. No. 12/548,222, mailed on Oct. 19, 2011, 27 pages.
Non-Final Office Action for U.S. Appl. No. 12/548,281, mailed on Oct. 3, 2011, 37 pages.
Non-Final Office Action for U.S. Appl. No. 12/548,290, mailed on Oct. 3, 2011, 34 pages.
Notice of Allowance for U.S. Appl. No. 11/874,896, mailed on Jun. 23, 2011, 30 pages.
Final Office Action for U.S. Appl. No. 11/874,197, mailed on Aug. 12, 2011, 26 pages.
Notice of Allowance for U.S. Appl. No. 11/927,681, mailed on Jul. 1, 2011, 8 pages.
Final Office Action for U.S. Appl. No. 11/927,683, mailed on Sep. 1, 2011, 18 pages.
Sansoterra "Empower SQL with Java User-Defined Functions," IT Jungle.com (Oct. 9, 2003).
Ullman et al., "Introduction to JDBC," Stanford University (2005).

(56) References Cited

OTHER PUBLICATIONS

Non-Final Office Action for U.S. Appl. No. 12/957,194 dated Dec. 7, 2012.
Non-Final Office Action for U.S. Appl. No. 13/089,556 dated Nov. 6, 2012.
Notice of Allowance for U.S. Appl. No. 12/534,398 dated Nov. 27, 2012.
Notice of Allowance for U.S. Appl. No. 12/506,905 dated Dec. 14, 2012.
Non-Final Office Action for U.S. Appl. No. 12/957,201 dated Dec. 19, 2012.
"Oracle Complex Event Processing CQL Language Reference," 11g Release 1 (11.1.1) E12048-01, Apr. 2010, 540 pages
Martin et al "Finding application errors and security flaws using PQL: a program query language," Proceedings of the 20th annual ACM SIGPLAN conference on Object-oriented programming, systems, languages, and applications 40:1-19 (Oct. 2005).
Office Action for U.S. Appl. No. 12/534,384 (Feb. 28, 2012).
Office Action for U.S. Appl. No. 12/506,905 (Mar. 26, 2012).
Office Action for U.S. Appl. No. 12/548,209 (Apr. 16, 2012).
Notice of Allowance for U.S. Appl. No. 13/184,528 (Mar. 1, 2012).
Esper Reference Documentation, Copyright 2009, ver. 3.1.0, 293 pages.
International Search Report dated Jul. 16, 2012 for PCT/US2012/034970.
Final Office Action for U.S. Appl. No. 12/548,290 dated Jul. 30, 2012.
Office Action for U.S. Appl. No. 13/193,377 dated Aug. 23, 2012.
Office Action for U.S. Appl. No. 11/977,437 dated Aug. 3, 2012.
Final Office Action for U.S. Appl. No. 11/601,415 dated Jul. 2, 2012.
Notice of Allowance for U.S. Appl. No. 12/506,891 dated Jul. 25, 2012.
Final Office Action for U.S. Appl. No. 12/506,905 dated Aug. 9, 2012.
Office Action for U.S. Appl. No. 12/548,187 (Jun. 20, 2012).
Notice of Allowance for U.S. Appl. No. 12/395,871 (May 4, 2012).
Office Action for U.S. Appl. No. 12/548,222 (Jun. 20, 2012).
Office Action for U.S. Appl. No. 12/534,398 (Jun. 5, 2012).
Office Action for U.S. Appl. No. 12/548,281 (Jun. 20, 2012).
Office Action for U.S. Appl. No. 12/913,636 (Jun. 7, 2012).
Notice of Allowance for U.S. Appl. No. 12/874,197 (Jun. 22, 2012).
Final Office Action for U.S. Appl. No. 12/396,464 dated Jan. 16, 2013, 16 pages.
Final Office Action for U.S. Appl. No. 12/913,636 dated Jan. 8, 2013, 20 pages.
Final Office Action for U.S. Appl. No. 12/193,377 dated Jan. 17, 2013, 24 pages.
Final Office Action for U.S. Appl. No. 12/534,384 dated Feb. 12, 2013, 13 pages.
Final Office Action for U.S. Appl. No. 13/107,742 dated Feb. 14, 2013, 15 pages.
Non-Final Office Action for U.S. Appl. No. 13/102,665 dated Feb. 1, 2013, 11 pages.
Notice of Allowance for U.S. Appl. No. 11/977,437 dated Mar. 4, 2013. 9 pages.
Final Office Action for U.S. Appl. No. 13/244,272 dated Mar. 28, 2013, 29 pages.
Notice of Allowance for U.S. Appl. No. 12/957,194 dated Mar. 20, 2013. 9 pages.
U.S. Appl. No. 12/534,384, Notice of Allowance mailed on May 7, 2013, 12 pages.
U.S. Appl. No. 12/548,187, Non-Final Office Action mailed on Apr. 9, 2013, 17 pages.
U.S. Appl. No. 12/548,222, Non-Final Office Action mailed on Apr. 10, 2013, 16 pages.
U.S. Appl. No. 12/548,281, Non-Final Office Action mailed on Apr. 12, 2013, 16 pages.
U.S. Appl. No. 12/548,290, Non-Final Office Action mailed on Apr. 15, 2013, 17 pages.
U.S. Appl. No. 12/957,201, Final Office Action mailed on Apr. 25, 2013, 11 pages.
U.S. Appl. No. 13/089,556, Non-Final Office Action mailed on Apr. 10, 2013, 10 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, 2002, pp. 238-239 and 529.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action, mailed on Aug. 13, 2014, 19 pages.
U.S. Appl. No. 12/957,201, Non-Final Office Action mailed on Jul. 30, 2014, 12 pages.
U.S. Appl. No. 13/764,560, Non-Final Office Action mailed on Sep. 12, 2014, 23 pages.
U.S. Appl. No. 13/770,969, Non-Final Office Action mailed on Aug. 7, 2014, 9 pages.
U.S. Appl. No. 14/302,031, Non-Final Office Action mailed on Aug. 27, 2014, 19 pages.
Abadi et al., Aurora: a new model and architecture for data stream management, The VLDB Journal The International Journal on Very Large Data Bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal The International Journal on Very Large Data Bases, vol. 12, No. 2, Aug. 1, 2003, pp. 140-156.
Dewson, Beginning SOL Server 2008 for Developers: From Novice to Professional, A Press, Berkeley, CA, 2008, pp. 337-349 and 418-438.
Harish D et al., Identifying robust plans through plan diagram reduction, PVLDB '08, Auckland, New Zealand, Aug. 23-28, pp. 1124-1140.
Krämer, Continuous Queries Over Data Streams—Semantics and Implementation, Fachbereich Mathematik und Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion mailed on Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report mailed on Sep. 9, 2014, 4 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~ 2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's LEarning Optimizer, Proc. of the VLDB, Roma, Italy, Sep. 2001, pp. 19-28.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.

(56) References Cited

OTHER PUBLICATIONS

Non-Final Office Action for U.S. Appl. No. 12/913,636 dated Jul. 24, 2014, 21 pages.
U.S. Appl. No. 11/874,197, Notice of Allowance mailed on Jun. 22, 2012, 20 pages.
U.S. Appl. No. 12/396,464, Final Office Action mailed on May 16, 2014, 16 pages.
U.S. Appl. No. 12/396,464, Non-Final Office Action mailed on Sep. 7, 2012, 18 pages.
U.S. Appl. No. 12/548,187, Final Office Action mailed on Jun. 4, 2014, 64 pages.
U.S. Appl. No. 13/089,556, Final Office Action mailed on Jun. 13, 2014, 14 pages.
U.S. Appl. No. 13/107,742, Non-Final Office Action mailed on Jun. 19, 2014, 20 pages.
U.S. Appl. No. 13/244,272, Notice of Allowance mailed on Aug. 12, 2013, 12 pages.
International Application No. PCT/US2011/052019, International Preliminary Report on Patentability mailed on Mar. 28, 2013, 6 pages.
International Application No. PCT/US2012/034970, International Preliminary Report on Patentability mailed on Nov. 21, 2013, 7 pages.
International Application No. PCT/US2012/036353, International Preliminary Report on Patentability mailed on Nov. 28, 2013, 6 pages.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
U.S. Appl. No. 12/548,281, Non-Final Office Action mailed on Feb. 13, 2014, 16 pages.
U.S. Appl. No. 13/177,748, Final Office Action mailed on Mar. 20, 2014, 23 pages.
International Search Report dated Apr. 3, 2014 for PCT/US2014/010832, 9 pages.
Cadonna et al. "Efficient event pattern matching with match windows," Proceedings of the 18th ACM SIGKDD international conference on Knowledge discovery and data mining, pp. 471-479 (Aug. 2012).
Nichols et al. "A faster closure algorithm for pattern matching in partial-order event data," IEEE International Conference on Parallel and Distributed Systems, pp. 1-9 (Dec. 2007).

Oracle™ Fusion Middleware CQL Language Reference, 11g Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. 6.1 to 6.12.
Oracle™ Complex Event Processing CQL Language Reference, 11g Release 1 (11.1.1) E12048-03, Apr. 2010, sections 18-4 to 18.4.2.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>, No Date Given.
Pattern Recognition With Match_Recognize, Oracle™ Complex Event Processing CQL Language Reference, 11g Release 1 (11.1.1) E12048-01, May 2009, pp. 15.1 to 15.20.
Supply Chain Event Management: Real-Time Supply Chain Event Management, product information Manhattan Associates, 2009-2012.
What is BPM?, Datasheet [online]. IBM, [retrieved on Jan. 28, 2013]. Retrieved from the Internet: <URL: http://www-01.ibm.com/software/info/bpm/whatis-bpm/>, No Date Given.
U.S. Appl. No. 11/601,415, Non-Final Office Action mailed on Dec. 11, 2013, 58 pages.
U.S. Appl. No. 12/396,464, Non Final Office Action mailed on Dec. 31, 2013, 16 pages.
U.S. Appl. No. 13/089,556, Non-Final Office Action mailed on Jan. 9, 2014, 14 pages.
Non-Final Office Action for U.S. Appl. No. 12/548,187 dated Feb. 6, 2014, 53 pages.
Agrawal et al. "Efficient pattern matching over event streams," Proceedings of The 2008 ACM SIGMOD international conference on Management of data, pp. 147-160 (Jun. 2008).
Chandramouli et al., High-Performance Dynamic Pattern Matching over Disordered Streams, Proceedings of the VLDB Endowment, vol. 3, Issue 1-2, Sep. 2010, pp. 220-231.
Chapple "Combining Query Results with the UNION Command," ask.com Computing Databases, downloaded from: http://databases.about.com/od/sql/a/union.htm (no date, printed on Oct. 14, 2013).
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
Pradhan, Implementing and Configuring SAP® Event Management, Galileo Press, 2010, pp. 17-21.
Wilson et al., SAP Event Management, an Overview, Q Data USA, Inc., 2009.
U.S. Appl. No. 12/548,281, Final Office Action mailed on Oct. 10, 2013, 21 pages.
U.S. Appl. No. 12/548,290, Notice of Allowance mailed on Sep. 11, 2013, 6 pages.
U.S. Appl. No. 13/089,556, Final Office Action mailed on Aug. 29, 2013, 10 pages.
U.S. Appl. No. 13/177,748, Non-Final Office Action mailed on Aug. 30, 2013, 24 pages.
U.S. Appl. No. 13/193,377, Notice of Allowance mailed on Aug. 30, 2013, 19 pages.
U.S. Appl. No. 12/548,187, Final Office Action mailed on Jun. 10, 2013, 18 pages.
U.S. Appl. No. 12/548,222, Notice of Allowance mailed on Jul. 18, 2013, 12 pages.
U.S. Appl. No. 13/102,665, Final Office Action mailed on Jul. 9, 2013, 17 pages.
U.S. Appl. No. 13/107,742, Final Office Action mailed on Jul. 3, 2013, 19 pages.
Notice of Allowance for U.S. Appl. No. 11/977,437 dated Jul. 10, 2013, 10 pages.
SQL Tutorial-In, Tizag.com, http://web.archive.org/web/20090216215219/http://www.tizag.com/sgiTutorial/sqlin.php, Feb. 16, 2009, pp. 1-3.

(56) References Cited

OTHER PUBLICATIONS

Japan Patent Office office actions JPO patent application JP2013-529376 (Aug. 18, 2015).
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Notice of Allowance for U.S. Appl. No. 13/830,129 dated Sep. 22, 2015, 9 pages.
Final Office Action for U.S. Appl. No. 13/770,961 dated Aug. 31, 2015, 28 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
"Oracle Complex Event Processing Exalogic Performance Study" an Oracle White Paper, Sep. 2011, 16 pages.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", The VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Notice of Allowance for U.S. Appl. No. 12/913,636 dated Oct. 27, 2015, 22 pages.
Final Office Action for U.S. Appl. No. 13/830,378 dated Nov. 5, 2015, 28 pages.
Non-Final Office Action for U.S. Appl. No. 13/830,502 dated Dec. 11, 2015, 25 pages.
Non-Final Office Action for U.S. Appl. No. 11/601,415 dated Nov. 13, 2015, 18 pages.
China Patent Office office actions for patent application CN201180053021.4 (Oct. 28, 2015).
China Patent Office office actions for patent application CN201280022008.7 (Dec. 3, 2015).
European Application No. 12783063.6, Office Action mailed on Nov. 11, 2015, 8 pages.
Notice of Allowance for U.S. Appl. No. 12/548,187, dated Feb. 2, 2016, 15 pages.
Notice of Allowance for U.S. Appl. No. 14/037,072 dated Feb. 16, 2016, 17 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Non-Final Office Action for U.S. Appl. No. 13/827,631 dated Feb. 11, 2016, 12 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 pages.
"11 Oracle Event Processing NoSQL 1-20 Database Data Cartridge—11g Release 1 (11.1.1.7) 11," Oracle Fusion Middleware CQL Language Reference for Oracle Event Processing 11g Release 1 (11.1.1.7), 4 pages (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Non-Final Office Action for U.S. Appl. No. 13/830,781,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
Final Office Action for U.S. Appl. No. 13/828,640 dated Jun. 17, 2015, 11 pages.
International Application No. PCT/US2014/039771, International Search Report and Written Opinion mailed on Apr. 29, 2015 6 pages.
International Application No. PCT/US2015/016346, International Search Report and Written Opinion mailed on May 4, 2015, 9 pages.
International Preliminary Report on Patentability dated Apr. 9, 2015 for PCT/US2013/062047, 10 pages.

(56) References Cited

OTHER PUBLICATIONS

International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
U.S. Appl. No. 12/957,201, Notice of Allowance mailed on Jan. 21, 2015, 5 pages.
U.S. Appl. No. 13/089,556, Notice of Allowance mailed on Oct. 6, 2014, 7 pages.
U.S. Appl. No. 13/107,742, Final Office Action mailed on Jan. 21, 2015, 23 pages.
U.S. Appl. No. 13/177,748, Non-Final Office Action mailed on Feb. 3, 2015, 22 pages.
U.S. Appl. No. 13/770,961, Non-Final Office Action mailed on Feb. 4, 2015, 22 pages.
U.S. Appl. No. 13/770,969, Notice of Allowance mailed on Jan. 22, 2015, 5 pages.
U.S. Appl. No. 13/829,958, Non-Final Office Action mailed on Dec. 11, 2014, 15 pages.
U.S. Appl. No. 13/906,162, Non-Final Office Action mailed on Dec. 29, 2014, 10 pages.
International Application No. PCT/US2014/010832, Written Opinion mailed on Dec. 15, 2014, 5 pages.
International Application No. PCT/US2014/010920, International Search Report and Written Opinion mailed on Dec. 15, 2014, 10 pages.
International Application No. PCT/US2014/017061, Written Opinion mailed on Feb. 3, 2015, 6 pages.
International Application No. PCT/US2014/039771, International Search Report and Written Opinion mailed on Sep. 24, 2014, 12 pages.
Cranor et al. "Gigascope: a stream database for network applications," Proceedings of the 2003 ACM SIGMOD international conference on Management of data, pp. 647-651 (Jun. 2003).
Oracle® Complex Event Processing EPL Language Reference 11g Release 1 (11.1.1.4.0), E14304-02, Jan. 2011, 80 pages.
De Castro Alves, A General Extension System for Event Processing Languages, DEBS '11, New York, NY, USA, Jul. 11-15, 2011, pp. 1-9.
Takenaka et al., A scalable complex event processing framework for combination of SQL-based continuous queries and C/C++ functions, FPL 2012, Oslo, Norway, Aug. 29-31, 2012, pp. 237-242.
Tomàs et al., RoSeS: A Continuous Content-Based Query Engine for RSS Feeds, DEXA 2011, Toulouse, France, Sep. 2, 2011, pp. 203-218.
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
International Application No. PCT/US2014/068641, International Search Report and Written Opinion mailed on Feb. 26, 2015, 11 pages.
European Patent Application No. 12783063.6, Extended Search Report mailed Mar. 24, 2015, 6 pages.
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Notice of Allowance for U.S. Appl. No. 14/077,230 dated Apr. 16, 2015, 16 pages.
Final Office Action for U.S. Appl. No. 13/764,560 dated Apr. 15, 2015, 19 pages.
China Patent Office office action for patent application CN201180053021.4 (May 27, 2016).
cooperativesystems: "Combined WLAN and Inertial Indoor Pedestrian Positioning System" URL:https://www.youtube.com/watch?v=mEt88WaHZvU.
Frank et al "Development and Evaluation of a Combined WLAN & Inertial Indoor Pedestrian Positioning System" Proceedings of the 22$^{nd}$ International Technical Meeting of the Satellite Division of the Institute of Navigation (ION GNSS 2009). (Sep. 25, 2009) pp. 538-546.
International Application No. PCT/RU2015/000468, International Search Report and Written Opinion mailed on Apr. 25, 2016, 9 pages.
International Application No. PCT/US2015/016346, International Search Report and Written Opinion mailed on May 24, 2016, 5 pages.
International Preliminary Report on Patentabiilty dated Jun. 16, 2016 for PCT/US2014/068641, 7 pages.
Bestehorn Fault-tolerant query processing in structured P2P-systems, Springer Science+Business Media LLC Distrib Parallel Databases 28:33-66 (May 8, 2010).
Kramer "Semantics and Implementation of Continuous Sliding Window Queries over Data Streams" ACM Transactions on Database Systems, vol. 34, pp. 4:1 to 4:49 (Apr. 2009).
Final Office Action for U.S. Appl. No. 11/601,415 dated May 17, 2016, 17 pages.
Final Office Action for U.S. Appl. No. 13/829,958 dated Jun. 30, 2016, 19 pages.
Final Office Action for U.S. Appl. No. 13/830,428 dated May 26, 2016, 26 pages.
Final Office Action for U.S. Appl. No. 13/830,502 dated Jul. 6, 2016, 28 pages.
Final Office Action for U.S. Appl. No. 14/036,659 dated Apr. 22, 2016, 38 pages.
Non-Final Office Action for U.S. Appl. No. 14/883,815 dated May 10, 2016, 32 pages.

\* cited by examiner

SPATIAL DATA CARTRIDGE FOR EVENT PROCESSING SYSTEMS

CROSS-REFERENCES TO RELATED APPLICATIONS

The present application claims the benefit and priority under 35 U.S.C. 119(e) of the following provisional applications, the entire contents of which are incorporated herein by reference for all purposes:

U.S. Provisional Application No. 61/290,460, filed Dec. 28, 2009, entitled EXTENSIBILITY PLATFORM USING DATA CARTRIDGES;

U.S. Provisional Application No. 61/311,175, filed Mar. 5, 2010, entitled EXTENSIBILITY PLATFORM USING DATA CARTRIDGES;

U.S. Provisional Application No. 61/327,903, filed Apr. 26, 2010, entitled EXTENSIBLE INDEXING FRAMEWORK USING DATA CARTRIDGES; and U.S. Provisional Application No. 61/355,415, filed Jun. 16, 2010, entitled SPATIAL DATA CARTRIDGE FOR EVENT PROCESSING SYSTEMS.

BACKGROUND

Embodiments of the present invention relate in general to event processing, and in particular to a spatial data cartridge for event processing systems.

Databases have traditionally been used in applications that require storage of data and querying capability on the stored data. Existing databases are thus best equipped to run queries over a finite stored data set. The traditional database model is however not well suited for a growing number of modern applications in which data is received as a stream of data events instead of being stored as a bounded data set. A data stream, also referred to as an event stream, is characterized by a real-time, potentially continuous, sequence of events. A data or event stream thus represents a potentially unbounded stream of data. Examples of sources of events can include various sensors and probes (e.g., RFID sensors, temperature sensors, etc.) configured to send a sequence of sensor readings, financial tickers sending out pricing information, network monitoring and traffic management applications sending network status updates, events from click stream analysis tools, global positioning systems (GPSs) sending GPS data, and others.

Oracle Corporation™ provides a system (referred to as a Complex Event Processing, or CEP, system) for processing such event streams. A CEP system is quite different from a relational database management system (RDBMS) in which data is stored in a database and then processed using one or more queries. In a CEP system, a query is run continuously and query processing is performed in real-time as events in a stream are received by the system.

A CEP system can receive data events from various different sources for various different applications. Accordingly, the data that is received may not follow a fixed format or schema but may be more heterogeneous in nature (e.g., binary data, XML data without an associated schema, etc.). For example, the data that is received may include streams of image data for an image processing application, streams of audio data for an audio processing application, streams of spatial or geographic or location data for a GPS application, streams of stock data for a financial application, and the like. As a result of the different data types and sources and their different data manipulation requirements, specialized functions or methods are usually needed to process the streaming data. While a CEP system can provide support for some native data types and/or methods/functions for the native data types, these native data types or functions are many times not sufficient to cover the diverse types of processing needed by applications that use a CEP system.

As a result, processing platforms, such as CEP systems, constantly have to be extended by application developers and service providers to support heterogeneous data formats and their data manipulation mechanisms in order to interact/interoperate with diverse sources of events and data. For example, consider a CEP system that processes localization events emitted by GPS devices. Such a CEP system would need to understand spatial data formats and functions related to the spatial data format.

In the past, the capabilities of a CEP system were extended exclusively through user defined functions (UDFs) or special code (e.g., customized Java beans). To achieve extensibility, an application developer for a specific application had to define customized user defined functions (UDFs) to interact with the specialized application. The application developer had to design one function at a time and define the function's interface based upon predefined data types provided by the CEP system.

However, this process has several drawbacks and inefficiencies. The UDFs that are designed are application-scoped and thus are hard to re-use amongst other applications of the CEP system. The UDFs cannot be reused since they are closely coupled or tied to the application defining the UDF. For example, a UDF defined for a video-processing application cannot be used in another application. Further, the UDFs are individually defined and cannot be grouped into domains (e.g., spatial), therefore making their management difficult. Additionally, UDFs provide a poor programming experience, as the usage of the extension in the form of a UDF is not transparent to the user.

BRIEF SUMMARY

Embodiments of the present invention provide techniques for extending the capabilities of an event processing system to support the processing of spatial data. In one set of embodiments, this extensibility can be provided via a plug-in extension component referred to herein as a spatial data cartridge. The spatial data cartridge can enable the event processing system to support spatial data types (e.g., point, polygon, etc.) and various operations related to such data types (e.g., proximity determinations, overlap determinations, etc.). The spatial data cartridge can also define an indexing scheme that can be integrated with the capabilities of the event processing system to support the indexing of spatial data. Using the spatial data cartridge, the event processing system can operate on spatial data even if spatial data formats are not natively supported by the system.

According to one embodiment of the present invention, a system is provided that includes a storage component configured to store a spatial data cartridge including metadata pertaining to a spatial function and code that implements the spatial function, where the spatial function is configured to determine a topological relationship between first spatial data and second spatial data. The system further includes a processor configured to receive a query referencing the spatial function, the query being adapted to process one or more data streams, compile the query based on the metadata included in spatial data cartridge, and execute the query based on the code included in the spatial data cartridge.

In one embodiment, the system is an event processing system.

In one embodiment, the query is a Continuous Query Language (CQL) query.

In one embodiment, the query includes a link definition that specifies the spatial function and the spatial data cartridge, and the processor is configured to identify the spatial data cartridge based on the link definition.

In one embodiment, the spatial function is selected from a group consisting of: contains, inside, withindistance, overlaps, touch, covers, and coveredby.

In one embodiment, the spatial data cartridge further includes metadata pertaining to one or more spatial data types and one or more spatial indexes.

In one embodiment, the one or more spatial data types are selected from a group consisting of: point, curve, polygon, and solid.

In one embodiment, compiling the query includes retrieving the metadata pertaining to the spatial function from the spatial data cartridge, performing semantic analysis of the query based on the metadata, and generating instructions for executing the query.

In one embodiment, executing the query includes executing the code that implements the spatial function in the spatial data cartridge.

In one embodiment, executing the code that implements the spatial function includes performing a first filter operation with respect to data in a first spatial data stream and data in a second spatial data stream, the first filter operation returning a superset of an exact result set for the spatial function; and performing a second filter operation with respect to the superset, the second filter operation returning the exact result set for the spatial function.

In one embodiment, performing the first filter operation includes comparing geometric approximations of the data in the first spatial data stream and the data in the second spatial data stream; and determining likely topological relationships between the data in the first spatial data stream and the data in the second spatial data stream based on the comparing.

In one embodiment, performing the second filter operation includes comparing exact geometries of the data in the first spatial data stream and the data in the second spatial data stream; and determining exact topological relationships between the data in the first spatial data stream and the data in the second spatial data stream based on the comparing.

In one embodiment, performing the first filter operation includes performing an index scan of a spatial index created for the first spatial data stream or the second spatial data stream.

In one embodiment, the storage component is further configured to store spatial context information, and executing the query is further based on the spatial context information.

In one embodiment, the spatial context information identifies a geometric coordinate system.

According to another embodiment of the present invention, a non-transitory computer-readable storage medium is provided that has stored thereon instructions executable by a processor. The instructions include instructions that cause the processor to register a spatial data cartridge including metadata pertaining to a spatial function and code that implements the spatial function, the spatial function being configured to determine a topological relationship between first spatial data and second spatial data. The instructions further include instructions that cause the processor to receive a query referencing the spatial function, the query being adapted to process one or more data streams, instructions that cause the processor to compile the query based on the metadata included in spatial data cartridge; and instructions that cause the processor to execute the query based on the code included in the spatial data cartridge.

According to another embodiment of the present invention, a method is provided that includes registering, by a computer system, a spatial data cartridge including metadata pertaining to a spatial function and code that implements the spatial function, the spatial function being configured to determine a topological relationship between first spatial data and second spatial data. The method further includes receiving, by the computer system, a query referencing the spatial function, the query being adapted to process one or more data streams, compiling, by the computer system, the query based on the metadata included in spatial data cartridge, and executing, by the computer system, the query based on the code included in the spatial data cartridge.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that certain embodiments can be practiced without these specific details.

Embodiments of the present invention provide techniques for extending the capabilities of an event processing system to support the processing of spatial data. In one set of embodiments, this extensibility can be provided via a plug-in extension component (i.e., a "data cartridge") referred to as a spatial data cartridge. The spatial data cartridge can enable the event processing system to support spatial data types (e.g., point, polygon, etc.) and various operations related to such data types (e.g., proximity determinations, overlap determinations, etc.). The spatial data cartridge can also define an indexing scheme that can be integrated with the capabilities of the event processing system to support the indexing of spatial data.

As used herein, a "data cartridge" is a self-contained manageable unit that provides information for extending the capabilities of an event processing system. Examples of capabilities that can be extended include providing support for extensible data types, functions, indexing options, different sources of data, and others. A spatial data cartridge is a particular type of data cartridge that extends the capabilities of the event processing system to support the processing and indexing of spatial data (e.g., geographic or location data).

In one set of embodiments, the spatial data cartridge described herein can be used in conjunction with an event processing system such as the Complex Event Processing (CEP) system/server provided by Oracle Corporation™.

Figure 1:
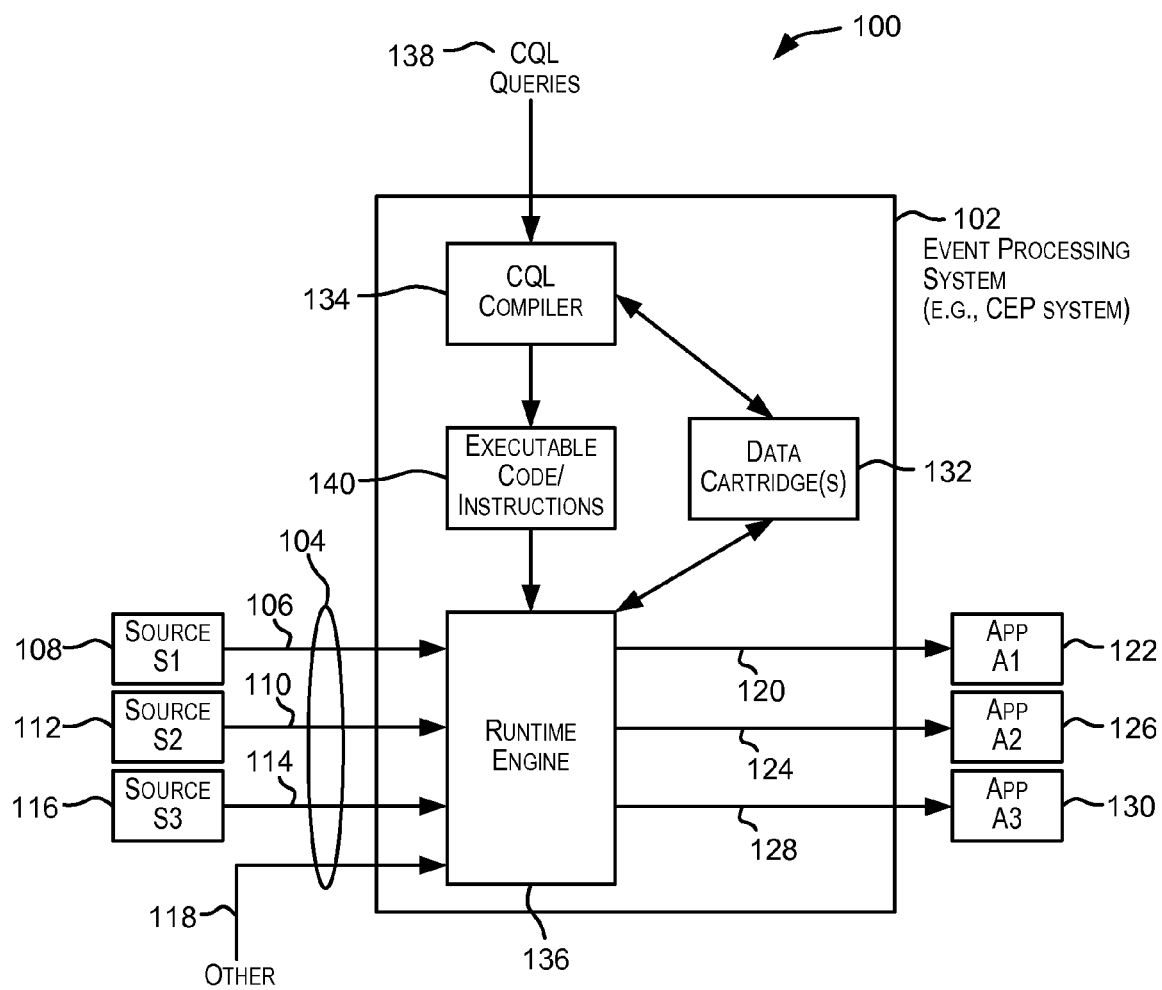
FIG. 1 is a simplified block diagram of an event processing system in accordance with an embodiment of the present invention.

FIG. 1 is a simplified block diagram of a system 100 according to an embodiment of the present invention. As shown, system 100 includes an event processing system 102 that is configured to process event streams. Event processing system 102 can be a CEP system such as the one provided by Oracle Corporation™. Other event processing systems provided by other vendors can be used in alternative embodiments. The embodiment depicted in FIG. 1 is not intended to limit the scope of embodiments of the invention. Variations having more or less components than shown in FIG. 1 are possible in alternative embodiments.

Event processing system 102 can receive one or more inputs 104. Inputs 104 can include one or more event streams received from one or more sources. For example, as depicted in FIG. 1, event processing system 102 can receive an event stream 106 from a source S1 108, an event stream 110 from a source S2 112, and another event stream 114 from a source S3 116. The sources can be diverse; for example, source S1 can be an RFID sensor providing a stream of sensor readings, source S2 can be a GPS device providing a stream of spatial coordinates, and source S3 can be a financial server providing a stream of stock prices. Accordingly, the type of events received on one stream can be different from events received on another stream. Event processing system 102 can receive the streams via a push-based mechanism, a pull-based mechanism, or other types of mechanisms.

In one set of embodiments, an event stream can be a real-time sequence of events. In a particular embodiment, an event stream can correspond to a sequence of <tuple, timestamp> pairs, with the tuples representing the data portion of the stream. The timestamps associated with the tuples can define a chronological order over the tuples in the stream. In one set of embodiments, the timestamps can be set by an application (e.g., within event processing system 102) configured to receive and/or process the event stream. For example, the receiving application can timestamp each tuple/event upon receipt In other embodiments, the timestamps can be set an application configured to send out the event stream. In certain embodiments, multiple tuples can be associated with the same timestamp in a stream. For purposes of the present disclosure, the terms "tuple" and "event" are used interchangeably.

Inputs 104 can also include other inputs 118 such collections of elements (e.g., a relation). These other inputs 118 can be received from various sources including applications executing on external systems or even on event processing system 102. For example, other inputs 118 can comprise datasets (e.g., relations) configured by applications executing on systems external to event processing system 102 or on event processing system 102. In certain embodiments, the contents of a relation can vary over time. For example, the contents of a relation can change over time by adding one or more elements to the relation, deleting one or more elements from the relation, or updating the relation.

In various embodiments, event processing system 102 can process received inputs 104 and generate one or more outbound event streams as a result of the processing. The processing of inputs 104 can be based upon rules configured for event processing system 102 that determine the runtime behavior of the system. In a particular embodiment, these rules can be expressed as queries using a query language. An example of such a query language is Continuous Query Language (referred to herein as CQL). Generally speaking, CQL is a query language that is based upon SQL, with added constructs that support streaming data. A query written using CQL can be referred to as a CQL query. The queries can be used for processing inputs 104 and generating outbound event streams. Queries typically perform filtering and aggregation functions to discover and extract one or more events from the input streams. The CQL queries thus determine the runtime behavior of event processing system 102. The queries can represent the runtime conditions that are to be monitored over the streams.

The queries executed by an event processing system, such as event processing system 102 depicted in FIG. 1, are different from queries that are executed in a typical relational database management system (RDBMS). In an RDBMS, the data is stored in a database and a query is executed over the stored data. The lifetime of the query thus ends upon its execution. In event processing system 102, due to the streaming nature of the inputs, queries are run over a continuing period of time over time-varying data received over inputs such as input streams. Accordingly, these queries are referred to as continuous queries.

The outbound streams generated by event processing system 102 from the processing of the input streams can be provided to one or more applications. For example, as depicted in FIG. 1, an outbound stream 120 can be provided to application A1 122, a second outbound stream 124 can be provided to application A2 126, and a third outbound stream 128 can be provided to application A3 130. In certain embodiments, an application receiving an outbound stream can perform further processing on the stream. The applications receiving the outbound stream can be executing on event processing system 102 or some other system.

In one set of embodiments, event processing system 102 can natively support a fixed set of data types and operations on those data types (referred to herein as native data types and operations). For purposes of the present disclosure, the terms operation and function are used synonymously. In some situations, these native data types and operations may not sufficient to support the heterogeneous data formats received via the input streams 104 and the functions (e.g., data manipulation functions) related to the data formats. Thus, in certain embodiments, the capabilities of event processing system 102 can be extended through the use of one or more data cartridges 132. Generally speaking, data cartridges 132 enable event processing system 102 to support data types, operations, indexing schemes, and other objects not natively supported by the system. For example, in a particular embodiment, data cartridges 132 can include a spatial data cartridge that enables event processing system 102 to process and index spatial data (e.g., geographic or location data). The notion of a spatial data cartridge is discussed in greater detail below.

With a framework supporting data cartridges, CQL queries specified for event processing system 102 can not only reference capabilities provided natively by event processing system 102, but can also reference extended capabilities provided by one or more data cartridges 132. For example, a CQL query can refer to extensible objects (e.g., data types, functions, indexes, sources) defined by, e.g., a spatial data cartridge supporting spatial objects, a java data cartridge supporting java objects, and so on. In certain embodiments, references to data types and operations that are not supported natively by event processing system 102 can be seamlessly integrated with native data types and operations in the same query. In this manner, data cartridges 132 enable event processing system 102 to be easily extended beyond its native capabilities. As discussed in greater detail below, the processing to support such queries can be automatically taken care of by interactions between event processing system 102 and data cartridges 132.

Figure 2:
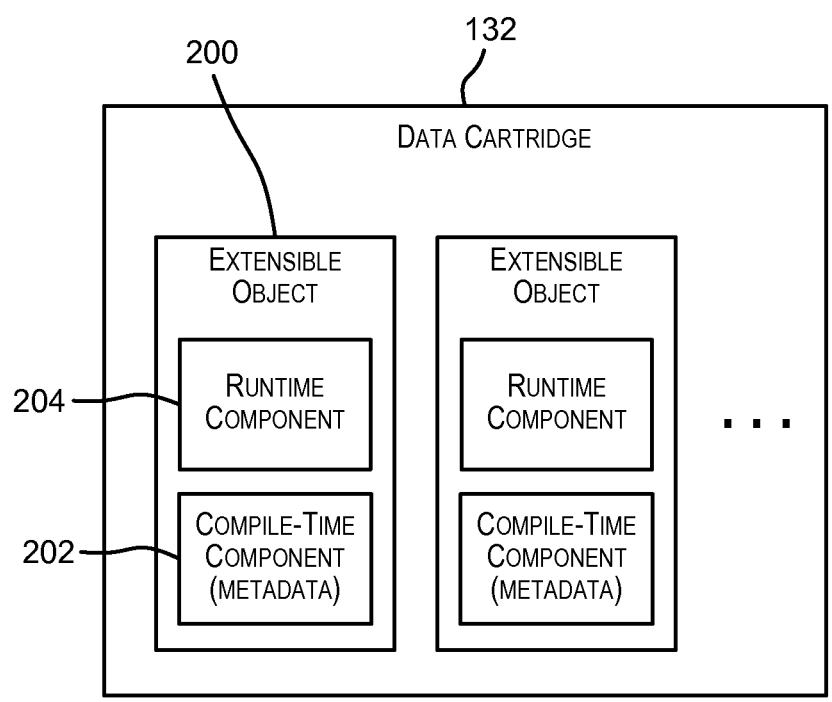
FIG. 2 is a simplified block diagram of a data cartridge in accordance with an embodiment of the present invention.

FIG. 2 is a simplified block diagram of a data cartridge 132 according to an embodiment of the present invention. As shown, data cartridge 132 can store information for one or more extensible objects 200. Examples of such extensible objects include data types, functions, indexes, sources, and others. In one set of embodiments, the information stored for each extensible object 200 can include at least two components or portions: (1) a compile-time (or metadata) component 202 that describes the extensible object in sufficient detail so that the object can be compiled; and (2) a runtime component 204 that can be invoked at execution time or runtime.

In one set of embodiments, compile-time component 202 can be used for compilation of queries (e.g., CQL queries). The compile-time component of an extensible object can include information (referred to generically as metadata) that describes the extensible object in enough detail so that the compilation of queries referencing the extensible object can perform all the necessary syntactic and semantic analyses and generate execution instructions that are executable at runtime. In some embodiments, extensible objects 200 can be of different types or classes. In these cases, each different object type/class can define a different set of metadata. In one embodiment, the metadata for a particular extensible object can include the signature of the extensible object's methods, fields, and constructors.

In various embodiments, all of the metadata provided by data cartridge 132 can be managed by the cartridge itself and not by event processing system 102. This avoids the need to keep data in-sync between data cartridge 132 and event processing system 102 or to pollute event processing system 102 with external data definitions. More details on how these components or portions of a data cartridge are used are provided below.

Referring back to FIG. 1, event processing system 102 can further include a compiler 134 and a runtime engine 136. Compiler 134 can be configured to compile one or more queries 138 (e.g., CQL queries) and generate executable code/instructions 140. In one set of embodiments, compiler 132 can use the compile-time components stored for the various extensible objects in a data cartridge to facilitate the compilation process. Code/instructions 140 generated as a result of the compilation can be executed during runtime to process incoming events. In certain embodiments, code/instructions 140 can comprise call-outs to functions that are implemented by runtime component 204 stored in data cartridge 132 for each extensible object. In this manner, a data cartridge provides both compile-time support and run-time implementations for an extensible object. The outbound data streams generated by the execution of code/instructions 140 can then be forwarded to one or more applications (e.g., 122, 126, 130).

In the embodiment of FIG. 1, compiler 134 and runtime engine 136 are shown as being part of the same event processing system 102. In alternative embodiments, these components can be resident on different systems. For example, in a particular embodiment, compiler 132 can be resident on a first system and runtime engine 136 can be resident on a second system, where both systems have access to the requisite data cartridges.

Several interactions can take place between event processing system 102 and a data cartridge 132 during query compilation and query runtime execution. For example, during the compilation phase, compiler 134 can receive from, and send to, data cartridge 132 information that facilitates compilation of the query and generation of executable code. During the runtime execution phase, execution of the code generated during the compilation phase can cause interactions and exchange of information between runtime engine 136 and data cartridge 132. For example, whenever a callout is encountered in the executable code and the implementation of the callout is provided by data cartridge 132, event processing system 102 can interact with the data cartridge.

Figure 3:
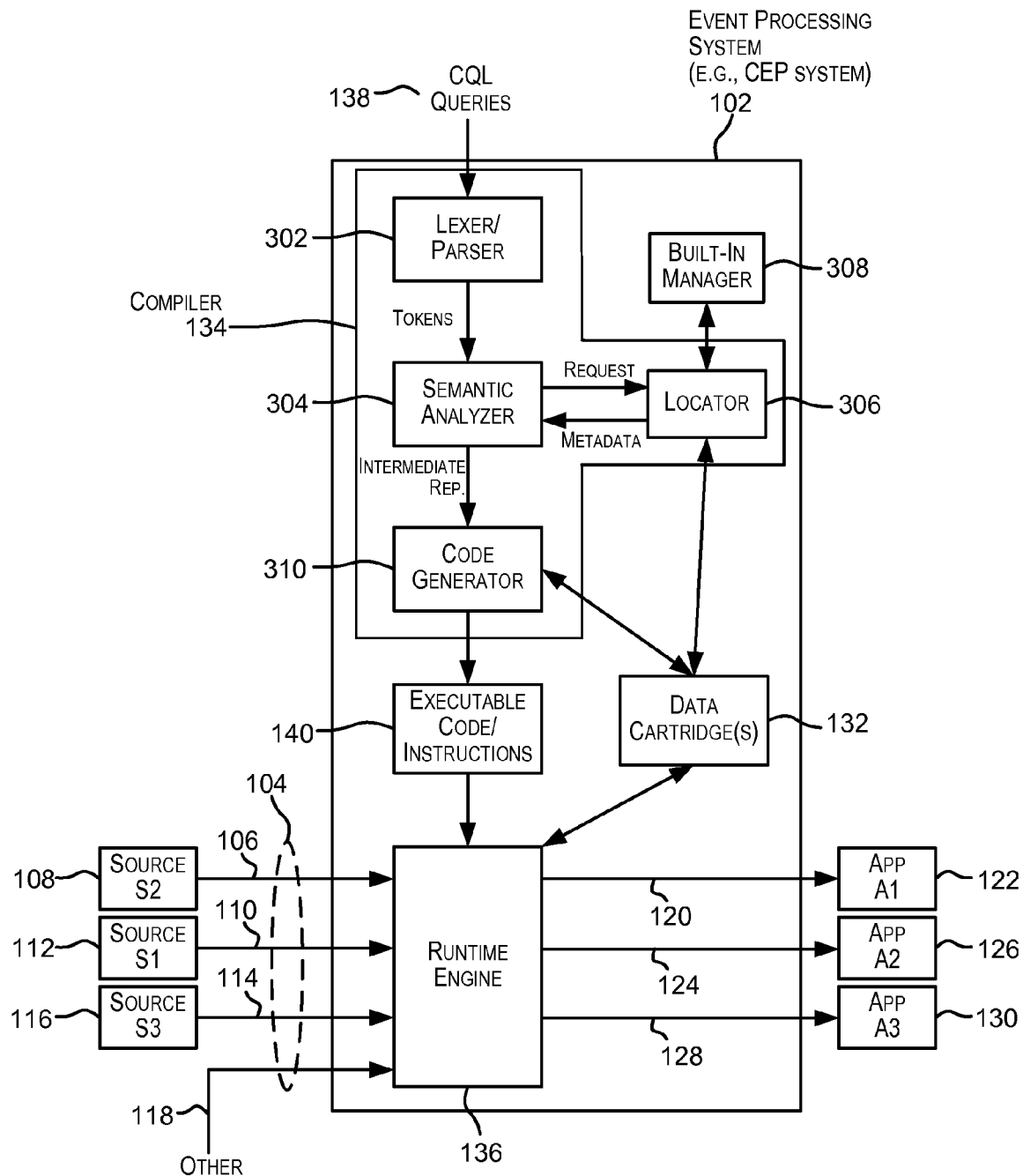
FIG. 3 is another simplified block diagram of an event processing system in accordance with an embodiment of the present invention.

FIG. 3 is another simplified block diagram of event processing system 102 according to an embodiment of the present invention. As in FIG. 1, event processing system 102 includes a compiler 134 and a runtime engine 136. Further, as shown in FIG. 3, compiler 134 can include a lexer/parser 302, a semantic analyzer 304, a locator module 306, and a code generator module 310. The components of compiler 134 can be implemented in software (code or instructions executed by a processor) or hardware, or combinations thereof. The software can be stored on a non-transitory computer-readable storage medium. The embodiment of event processing system 102 depicted in FIG. 3 is not intended to limit the scope of embodiments of the invention. Variations having more or less components than shown in FIG. 3 are possible in alternative embodiments.

At a conceptual level, the processing performed by event processing system 102 can be divided into design-time (or compile-time) processing and runtime processing. During design-time processing, compiler 134 can receive one or more continuous queries configured for the event processing system and can compile the queries. This compilation can result in the generation of executable code/instructions 140. One or more CQL queries can be compiled as a set to generate executable code/instructions 140. During runtime processing, runtime engine 136 can execute code/instructions 140 to process the incoming event streams 104.

Accordingly, at design-time, one or more queries (e.g., CQL queries) 138 can be provided as inputs to compiler 134. Parser 302 of compiler 134 can parse the queries based upon a grammar. For example, a CQL query can be parsed according to a CQL grammar. The tokens generated by parser 302 from parsing the query can then be passed to semantic analyzer 304 for further processing.

In one set of embodiments, the association between an extensible object and a repository (e.g., a data cartridge) storing metadata for the object is done though a link name or definition, which is specified in the query using the query language. In a particular embodiment, a CQL query programmer can use the following CQL code syntax to define a link definition in a query:

object@source

In this embodiment, the @ symbol signals to the compiler that a link definition is present. The string immediately before the @ symbol refers to an object or component (e.g., an extensible object) that is to be compiled and the string immediately after the @ symbol identifies the source or repository of the metadata to be used for compiling the object. The two strings are tokenized by parser 302 and provided to semantic analyzer 304 for semantic analysis. In this manner, a link definition can be provided at the query language level that enables compiler 134 of event processing system 102 to identify the component to be compiled and the source of the metadata (e.g., a data cartridge) to be used for compiling that query component. In one embodiment, a default data cartridge can be used if no specific data cartridge is identified.

Usage examples include:
(1) foo@java
where "foo" identifies an object or component (e.g., an extensible function) that is to be compiled using a "java" data cartridge. The "java" data cartridge stores metadata to be used for compiling the identified "foo" object. The "foo" object can be an extensible object such as an extensible data type, an extensible index, etc.
(2) foo@scala
Here, the component "foo" is to be compiled using a data cartridge named "scala" (different from the "java" data cartridge) that provides the metadata to be used for compiling the "foo" object. Note that the "foo" object is this example is not the same object as in the previous example; they are different objects since they are owned by different cartridges.
(3) CONTAINS@SPATIAL(R1.polygon, R2.point)
Here, "CONTAINS" identifies an extensible function defined within the "SPATIAL" data cartridge. As part of the parsing performed by parser 302, the arguments (if any) defined for a function can be determined and tokenized. In this example, the arguments of function CONTAINS include "R1.polygon" and "R2.point."

In one set of embodiments, before a data cartridge can be used by an event processing system, the data cartridge has to be registered with the event processing system. Various data cartridges can be registered with event processing system 102. The registration information stored for a data cartridge can identify the name of the data cartridge, e.g., "scala," "java," etc. This registration information can be stored in a registry of event processing system 102 and used during the compilation phase. For example, when a particular data cartridge is identified by a link definition in a query, information for the data cartridge can be fetched from the registration repository.

As described above, as part of the compilation process, parser 302 of event processing system 102 can parse CQL query 138 to identify occurrences of link definitions in the query. In one embodiment, the processing can include parsing the CQL query to look for occurrences of the @ symbol, and for each occurrence, determining the object to be compiled, the source of metadata for compiling the object, and arguments, if any, to the object. The tokens generated by parser 302 can then be passed to semantic analyzer 304 for semantic analysis.

Semantic analyzer 304 can perform semantic analysis on the query, such as type checking. In certain embodiments, for a set of tokens received from parser 302, semantic analyzer 304 can invoke a locator 306 to retrieve metadata to be used for performing semantic analysis related to the tokens. For example, based upon the tokens received from parser 302, semantic analyzer 304 can send a request to locator 306 to locate the metadata source or repository (e.g., a data cartridge) identified by a token. In response, locator 306 can provide semantic analyzer 304 a handle to the requested metadata source or repository.

In one set of embodiments, the repository can be a system that is internal to event processing system 102. For example, for natively supported data types and/or operations, the metadata can be provided by a built-in manager 308 of event processing system 102. For extensible objects that are not natively supported by event processing system 102, the repository can be a data cartridge 132 that is registered with event processing system 102.

Semantic analyzer 304 can then access or retrieve the requisite metadata stored by the metadata source using the handle provided by locator 306. Semantic analyzer 304 can use this retrieved information to perform semantic analysis. In one set of embodiments, using the handle, semantic analyzer 304 can interact with the metadata source via well-known interfaces provided by the developer of the repository. For example, if the metadata source is data cartridge 132, the data cartridge can provide well-known interfaces created by the data cartridge developer to enable semantic analyzer 304 to interact with the data cartridge. These well-known interfaces can be developed by the data cartridge developer according to predetermined interface standards that allow data cartridge 132 to be compatible with a data cartridge infrastructure provided by event processing system 102.

From the perspective of semantic analyzer 304, it does not matter whether the handle returned by locator 306 is a handle to a data cartridge or some other source; both handles are treated and interacted with in a similar manner. Locator 306 thus provides the interface between compiler 134 and the source of the metadata that enables the source of the metadata to be decoupled from compiler 134. This enables the metadata to be provided from any source, including a source within event processing system 102 or a data cartridge 132. Additionally, the source of the metadata can be distributed, for example, made available in a cloud, etc.

For instance, in examples (1), (2), and (3) shown above, semantic analyzer 304 can request locator 306 to get handles to data cartridges "java," "scala," and "SPATIAL." These data cartridges can be pre-registered with event processing system 102 and information related to the registered data cartridges, including the names of the data cartridges and handles to the data cartridges, can be stored in a registry. Locator 306 can perform a lookup in this registry to get a handle to the requested data cartridge and provide the handle to semantic analyzer 304.

Upon receiving a handle to a metadata source such as data cartridge 132, semantic analyzer 304 can interact with the data cartridge using published interfaces. For example, semantic analyzer 304 can use the interfaces to retrieve metadata from the data cartridge and use the retrieved metadata to perform semantic analysis of the query, including performing type checking for extensible objects included in the query. The result of the semantic analysis performed by semantic analyzer 304 is an intermediate representation that can be provided to code generator 310 for further analysis/processing.

In one set of embodiments, for a particular extensible object, the metadata provided to semantic analyzer 304 by data cartridge 132 for compilation of the extensible object can include information identifying one or more factories to be used for creating one or more instances of the extensible object. The metadata provided to compiler 134 can also include application context information that is used during runtime processing. For example, when performing spatial data analysis, a specific coordinate system usually need to be specified for performing the analysis. Different spatial data applications can use different coordinate systems. The application context information can be used to specify the coordinate system to be used during runtime for an application. This context information can be provided by data cartridge 132 to semantic analyzer 304 (or in general to compiler 134). In this manner, data cartridge 132 can provide information to event processing system 102 during the compilation phase that is to be used during the runtime phase. In certain embodiments, this application context information can be configured by a developer of the data cartridge. Thus, the data cartridge developer can set parameters to be used for runtime processing.

Code generator 310 can generate an execution plan for the query being compiled and can generate execution structures (e.g., executable code/instructions 140) based upon the execution plan. The execution structures that are generated can include instances of extensible objects referenced in the query. The extensible object instances can be created using one or more factories identified in the metadata retrieved from the data cartridge during compilation.

Executable instructions 140 generated by compiler 134 can then be executed at runtime by runtime engine 136 with respect to events received via an input stream 104. The instructions can comprise one or more call-out instructions whose implementations are provided by the runtime component stored by the data cartridge for the extensible object. A call-out instruction executes an invokable component that is part of the runtime component stored by the data cartridge for the extensible object. In one embodiment, a call-out invokes an "execute" call-back (i.e., function), whose implementation is provided by the data cartridge. This "function" in the data cartridge can be implemented using different programming languages, such as a Java type, a Hadoop function, a Scala class, etc. The call-out instruction thus provides a handoff between runtime engine 136 and data cartridge 132.

In the examples discussed above, the queries are expressed in CQL. Accordingly, compiler 134 and runtime engine 136 can be together referred to as the CQL engine of event processing system 102. In alternative embodiments, other languages that provide features for stream-based processing can also be used for configuring queries executed by event processing system 102.

The use of data cartridges thus enables event processing system 102 to handle complex data types and related functions that are not natively supported by the system. For example, object-oriented data types that cannot be natively supported by an event processing system can be supported by the event processing system via data cartridges. In a particular embodiment, use of a Java data cartridge can enable event processing system 102 to support object-oriented data types (classes) and programming constructs.

Figure 4:
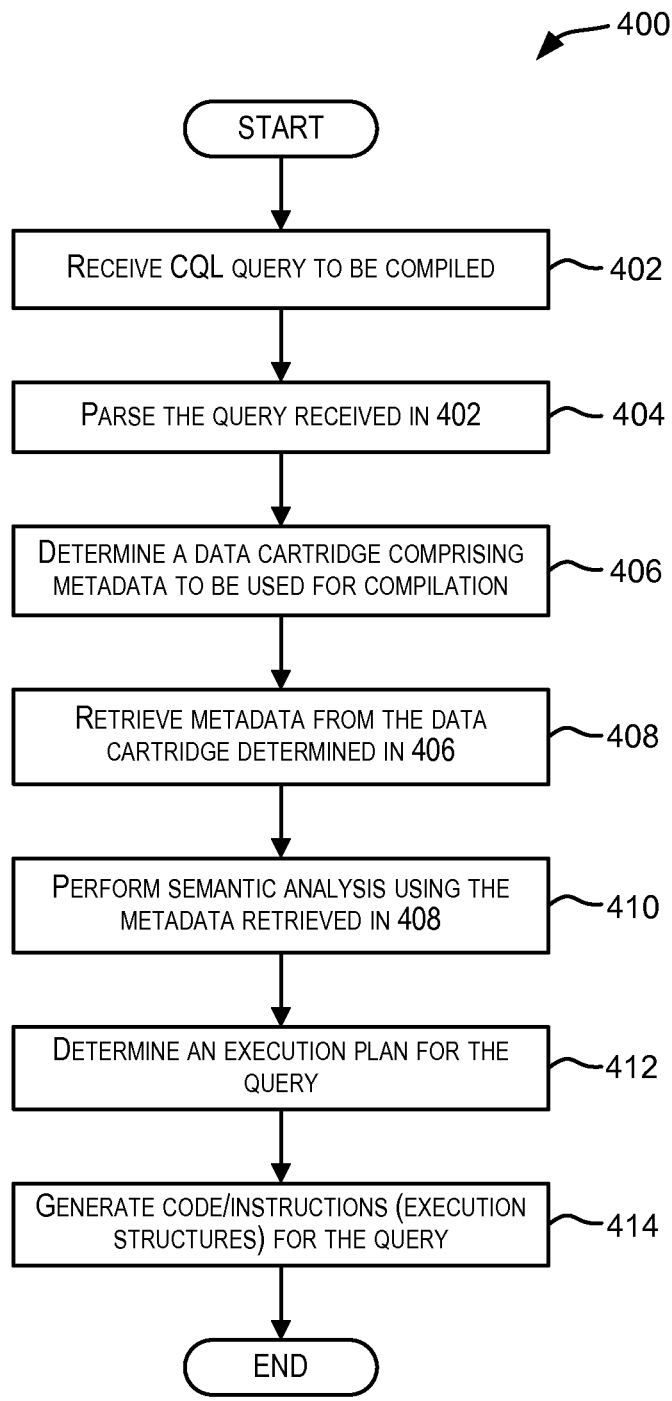
FIG. 4 is a flow diagram of a process performed by an event processing system for compiling a query using a data cartridge in accordance with an embodiment of the present invention.

FIG. 4 is a flow diagram of a process 400 for compiling a query in an event processing system using a data cartridge according to an embodiment of the present invention. In various embodiments, process 400 can be performed by software (e.g., program, code, instructions) executed by a processor, hardware, or combinations thereof. The software can be stored on a non-transitory computer-readable storage medium. In a particular embodiment, process 400 can be performed by compiler 134 of FIGS. 1 and 3.

As shown, processing can be initiated upon receiving a query to be compiled (block 402). In some embodiments, multiple queries can be received and compiled together as a set. However, for the sake of simplicity, it is assumed that one query is received in process 400. The query received in 402 can be, for example, a CQL query. The query can be received from various sources, such as sources 108, 112, 116, 118 of FIG. 1.

At block 404, the query can be parsed by a compiler 134 into a set of tokens. As part of this step, compiler 134 can identify (via, e.g., parser 302) one or more link definitions included in the query. These link definitions can identify extensible objects used in the query, as well as their corresponding data cartridges. Compiler 132 can then determine the data cartridges needed for compiling the query based upon the link definitions (block 406).

At block 408, compiler 134 can retrieve metadata from the data cartridge(s) determined at block 406. In one set of embodiments, compiler 134 first obtains (via, e.g., locator 306) a handle to each data cartridge. Using the handle, compiler can access metadata from the data cartridge via one or more well-known interfaces provided by the data cartridge.

At block 410, compiler can perform (via, e.g., semantic analyzer 304) various types of semantic analysis on the parsed query using the metadata retrieved at block 408. Such analysis can include, for example, type checking.

An execution plan can then be determined for the query, and code/instructions can be generated based upon the execution plan (blocks 412, 414). In one set of embodiments, the processing performed at block 414 can include instantiating execution structures for the query. The code/instructions generated at block 414 (including the execution structures) can be stored on a non-transitory computer-readable storage medium. In a particular embodiment, the execution structures can be generated using one or more factories identified by the metadata retrieved at block 408. The code/instructions can then be executed during runtime for processing event streams received by event processing system 102.

Although not shown in FIG. 4, in certain embodiments the metadata retrieved from a data cartridge at block 408 can include application context information that is to be used during runtime processing. This application context information can be incorporated into the code/instructions generated in 414.

It should be appreciated that process 400 is illustrative and that variations and modifications are possible. Steps described as sequential can be executed in parallel, order of steps can be varied, and steps can be modified, combined, added, or omitted. One of ordinary skill in the art will recognize many variations, modifications, and alternatives.

Figure 5:
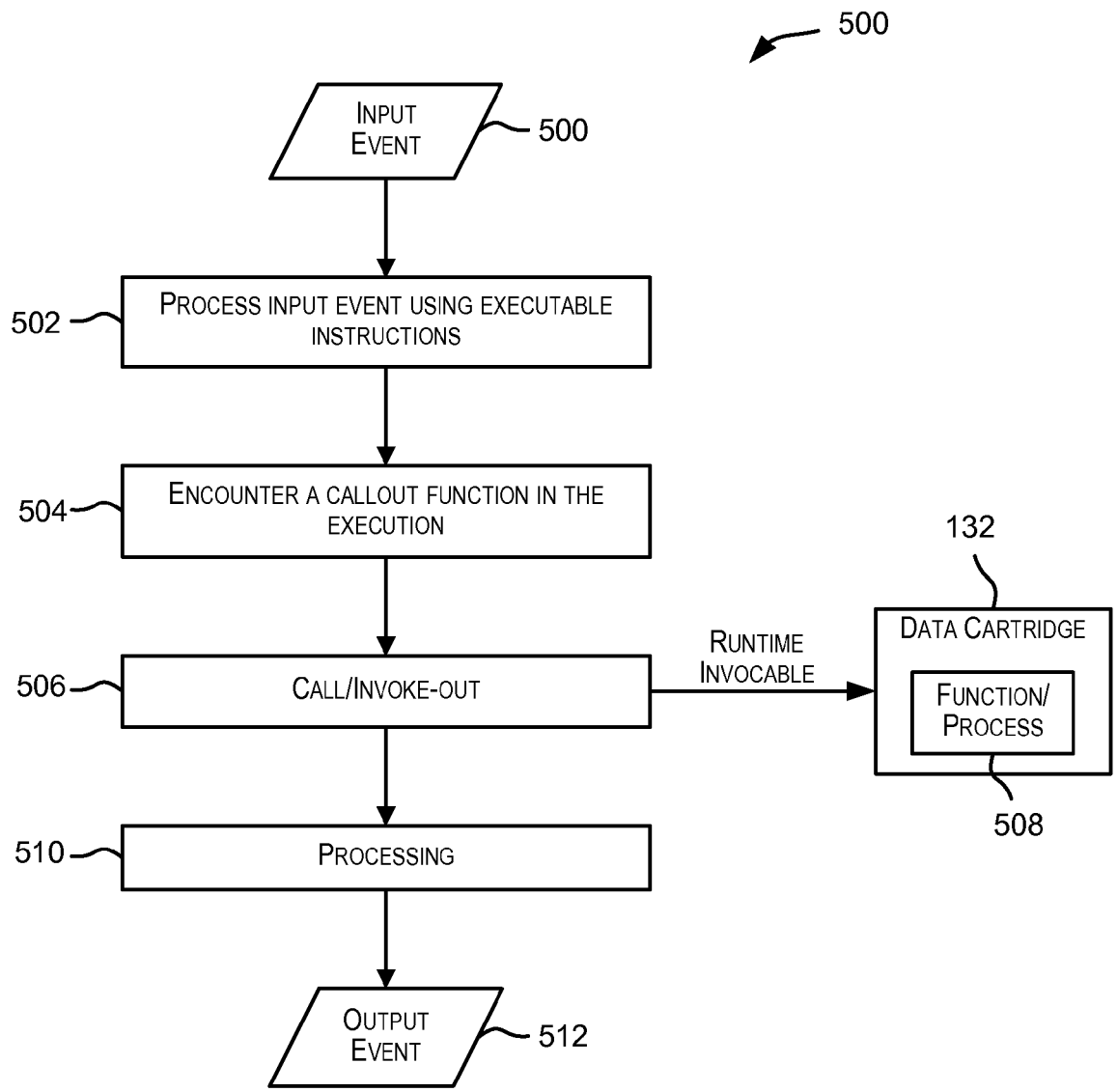
FIG. 5 is a flow diagram of a process performed by an event processing system for executing a query using a data cartridge in accordance with an embodiment of the present invention.

FIG. 5 is a flow diagram of a process 500 performed by an event processing system for executing a query using a data cartridge according to an embodiment of the present invention. In certain embodiments, process 500 can correspond to the runtime processing performed by event processing system 102 for executing the query compiled in FIG. 4. In a particular embodiment, process 500 can be performed by runtime engine 136 of system 102.

At block 502, runtime engine 136 can receive an input event 500 via an input stream (e.g., 108, 112, 116, 118) received by event processing system 102. Runtime engine 136 can then process input event 500 with respect to a query by executing the code/instructions generated for the query at block 414 of FIG. 4.

During execution of the code/instructions, runtime engine 136 can encounter a call-out function whose implementation (e.g., 508) is provided by data cartridge (e.g., 132). In response, runtime engine 136 can invoke the call-out function, which causes implementation 508 within data cartridge 132 to be executed (block 506). Implementation 508 can process input event 508, and can return the results of the processing to runtime engine 136. An output event 512 can then be generated based upon the processing (block 510). In various embodiments, the output event can be provided to one or more applications via an outbound stream (e.g., 102, 124, 128 of FIG. 1).

Although not shown in FIG. 5, in certain embodiments runtime engine 136 can pass application context information to data cartridge 132 when invoking the call-out function at block 506. This application context information can correspond to the context information received from the data cartridge during the compilation process of FIG. 4. Data cartridge can then execute the function/operation based on the application context information. For example, if data cartridge 132 is configured to provide support for spatial data types, and if the function invoked at block 506 is a spatial function (e.g., CONTAINS), runtime engine 136 may pass application context information including a spatial coordinate system to data cartridge 132. Data cartridge 132 can then execute the CONTAINS function on input event 500 with respect to the coordinate system specified in the application context information.

It should be appreciated that process 500 is illustrative and that variations and modifications are possible. Steps described as sequential can be executed in parallel, order of steps can be varied, and steps can be modified, combined, added, or omitted. One of ordinary skill in the art will recognize many variations, modifications, and alternatives.

As discussed above, embodiments of the present invention provide an infrastructure for extending the native capabilities of an event processing system via data cartridges. In one set of embodiments, the event processing system can interact with a data cartridge at query compilation time to retrieve metadata regarding extensible objects and to generate executable code/instructions for the query. Since the metadata for extensible objects is entirely contained within the data cartridge, the event processing system does not need to store any information pertaining to the objects.

In further set of embodiments, the event processing system can interact with the data cartridge at runtime to facilitate execution of the query. For example, when a call-out to a data cartridge function is encountered during execution of the query, the system can hand over processing to the data cartridge, which can execute the function as implemented within the cartridge. In various embodiments, the call-out can refer to a function related to an extensible object provided by the data cartridge. Since the implementation of the function is entirely contained within the data cartridge, the event processing system does not need to maintain any implementations or other code for extensible objects.

Thus, the data cartridge framework of the present invention provides a modular and flexible mechanism for extending the native capabilities of an event processing system. In particular, each data cartridge can be a self-contained, modular unit configured to store all of the compile-time metadata and runtime code need to support extensible objects. These data cartridges can then be dynamically registered/enabled on a particular system on an as needed basis to provide the additional features supported by the data cartridges. Since all data pertaining to extensible objects is maintained by the data cartridge, the event processing system does not need to be modified or customized for each desired feature.

This is substantially different from the use of UDFs (described in the Background section), where UDF-related needs to be stored in the memory of the event processing system. A data cartridge thus increases the scalability and usability of an event processing system. For example, data cartridges can be added to an event processing system without having to increase the memory and/or storage resources of the system.

In addition, the data cartridge framework of the present invention is preferable over UDFs because data cartridges can be reused by different applications, and even by different event processing systems. Further, data cartridges can assemble or group into several domain-specific extensible objects into a single manageable unit. Data cartridges can also provide a deeper integration with the native query language of an event processing system (e.g., CQL), thus providing a simpler programming experience.

In certain embodiments, the data cartridge framework enables the rapid integration of an event processing system with other technologies, such as the Java language, spatial manipulation services, Oracle RDBMS, data mining, and the like that cannot be otherwise supported by the event processing system. In one set of embodiments, a particular type of data cartridge (referred to herein as a spatial data cartridge) can be provided that can extend the capabilities of an event processing system to specifically support the processing of spatial data (e.g., geographic, geometric, or location data). For example, a spatial data cartridge can enable an event processing system to compile and execute CQL queries that reference spatial data streams and spatial operations over those streams. The spatial data cartridge can also enable the event processing system to efficiently index spatial data. Support for spatial data processing can be useful in a wide variety of applications, such as automobile traffic monitoring, emergency services, air traffic control, and the like, where it can be necessary to process continuous streams of two-dimensional or three-dimensional location data (e.g., geographic coordinates, etc.).

The following table identifies spatial data types that can be supported by the spatial data cartridge according to an embodiment of the present invention. As used herein, a "spatial data type" is a data type is that configured to describe spatial (e.g., geographic, geometric, location-based, etc.) data. Other spatial data types not listed below can also be supported.

| Spatial Data Type | Description |
| --- | --- |
| POINT | Geometry contains one point. |
| CURVE | Geometry contains one line string that can contain straight or circular arc segments, or both. (LINE and CURVE are synonymous in this context). |
| POLYGON, SURFACE | Geometry contains one polygon with or without holes or one surface consisting of one or more polygons. In a three-dimensional polygon, all points must lie on the same plane. |
| COLLECTION | Geometry is a heterogeneous collection of elements. COLLECTION is a superset that includes all other types. |

-continued

| Spatial Data Type | Description |
| --- | --- |
| MULTIPOINT | Geometry has one or more points (MULTIPOINT is a superset of POINT). |
| MULTICURVE | Geometry has one or more line strings. (MULTICURVE and MULTILINE are synonymous in this context, and each is a superset of both LINE and CURVE). |
| MULTIPOLYGON, MULTISURFACE | Geometry can have multiple, disjoint polygons (more than one exterior boundary) or surfaces (MULTIPOLYGON is a superset of POLYGON, and MULTISURFACE is a superset of SURFACE). |
| SOLID | Geometry consists of multiple surfaces and is completely enclosed in a three-dimensional space. Can be a cuboid or a frustum. |
| MULTISOLID | Geometry can have multiple, disjoint solids (more than one exterior boundary). (MULTISOLID is a superset of SOLID). |

The following table identifies spatial operators/functions that can be supported by the spatial data cartridge according to an embodiment of the present invention. As used herein, a "spatial operator/function" is a function is that configured to operate on spatial data types. Certain types of spatial functions can determine topological relationships between various spatial data instances. Other spatial functions not listed below can also be supported.

| Operator | Description |
| --- | --- |
| ANYINTERACT | Checks if any geometries have the ANYINTERACT topological relationship with a specified geometry. |
| CONTAINS | Checks if any geometries have the CONTAINS topological relationship with a specified geometry. |
| INSIDE | Checks if any geometries have the INSIDE topological relationship with a specified geometry. |
| WITHINDISTANCE | Determines if two geometries are within a specified distance from one another. |
| FILTER | Identifies the set of spatial objects that are likely to interact spatially with a given object. In one set of embodiments, this is performed by scanning a spatial index on the set of spatial objects (described in further detail below). |
| NN | Determines the nearest neighbor geometries to a geometry. |
| COVEREDBY | Checks if any geometries have the COVEREDBY topological relationship with a specified geometry. |
| COVERS | Checks if any geometries have the COVERS topological relationship with a specified geometry. |
| EQUAL | Checks if any geometries have the EQUAL topological relationship with a specified geometry. |
| ON | Checks if any geometries have the ON topological relationship with a specified geometry. |
| OVERLAPBDYDISJOINT | Checks if any geometries have the OVERLAPBDYDISJOINT topological relationship with a specified geometry. |
| OVERLAPBDYINTERSECT | Checks if any geometries have the OVERLAPBDYINTERSECT topological relationship with a specified geometry. |
| OVERLAPS | Checks if any geometries overlap (i.e., have the OVERLAPBDYDISJOINT or OVERLAPBDYINTERSECT topological relationship with) a specified geometry. |
| TOUCH | Checks if any geometries have the TOUCH topological relationship with a specified geometry. |

The following is an example of a CQL query that references a spatial data cartridge named "SPATIAL" and executes the CONTAINS function on two relations comprising spatial data:
SELECT *
FROM R1, R2
WHERE CONTAINS@SPATIAL(R1.polygon, R2.point)

The objective of this query is to output one tuple for each (polygon, point) pair from the cross product of relations R1 and R2 where the polygon contains the point. Merely by way of example, each point in R2 can represent the two-dimensional location of an individual, and each polygon in R1 can represent a two-dimensional hazard area (e.g., the location of a fire). Thus, in this example, the result set of the query can identify every individual that is located within a hazard area.

As shown, the CQL query includes a link definition ("CONTAINS@SPATIAL") indicating that the function CONTAINS is an extensible object defined within the data cartridge SPATIAL. In addition, the CQL statement specifies two spatial data types—polygon and point. As described with respect to FIG. 4 above, event processing system 102 of FIG. 1 can interact with the SPATIAL data cartridge at compile-time to retrieve metadata for the CONTAINS function and the polygon and point data types. Based on that metadata, executable code/instructions can be generated for the query. Further, as described with respect to FIG. 5 above, event processing system 102 can execute the generated code/instructions at runtime by invoking a call-out to the CONTAINS function as implemented in the SPATIAL data cartridge.

In one set of embodiments, the spatial data cartridge can use a two-tier query model to resolve spatial queries such as the query above. The first tier (referred to as the primary filter) can be used to quickly select candidate records to pass along to the second tier (referred to as the secondary filter). In one embodiment, the primary filter compares geometric approximations to reduce computational complexity, and thus is considered a lower-cost filter. Because the primary filter compares geometric approximations (rather than doing an exact geometric comparison), the filter returns a superset of the exact result set.

The secondary filter applies exact computations to the geometries that result from the primary filter. Thus, the secondary filter yields an exact answer to the spatial query. The second filter operation (i.e., performing exact geometric comparisons) can be computationally expensive, but is only applied to the primary filter results, rather than the entire data set. Thus, by using this two-tier query model, spatial operations can be performed in a computational efficient manner.

Applying this model to the CQL query example above, at runtime the SPATIAL data cartridge can run a primary filter on geometric approximations of the polygons in relation R1 to quickly determine a superset of polygons that can contain a given point in relation R2. The SPATIAL data cartridge can then perform an exact CONTAINS comparison based on the geometric coordinates of the polygons in the superset and the geometric coordinates of the point, thereby producing an exact result set.

In one set of embodiments, the spatial data cartridge can specify an indexing scheme for one or more spatial operators (the techniques for creating such an index are described U.S. Provisional Application No. 61/327,903, filed Apr. 26, 2010, entitled EXTENSIBLE INDEXING FRAMEWORK USING DATA CARTRIDGES, which the present application claims priority to, and which is incorporated herein by reference for all purposes). For example, the spatial data cartridge can instantiate a spatial index on the set of geometries to be searched via the CONTAINS operator. In these embodiments, the spatial index can be used to implement the primary filter.

The purpose of the spatial index is to quickly create a subset of the data to be searched and thereby reduce the processing burden on the secondary filter (i.e., where exact geometric comparisons are performed). A spatial index, like any other index, provides a mechanism to limit searches, but in the case of the spatial data cartridge the mechanism is based on spatial criteria such as intersection and containment.

In one set of embodiments, the spatial data cartridge can use R-Tree indexing as its default indexing mechanism. A spatial R-Tree index can index spatial data of up to four dimensions. In a particular embodiment, an R-Tree index can approximate each geometry by a single rectangle that minimally encloses the geometry (referred to as the minimum bounding rectangle, or MBR).

Returning to the CQL query example above, at compile-time, compiler 134 of event processing system 102 can determine (based on the metadata retrieved from the SPATIAL data cartridge) than an indexing scheme is provided for the CONTAINS operator, and thus compiler 134 can create an index-based execution plan for executing the query. In addition, an R-Tree index can be instantiated by the SPATIAL data cartridge for storing the polygons belonging to relation R1.

At runtime, when a new polygon is added to R1, the SPATIAL data cartridge can insert the new polygon into the R-Tree index instance. As part of this insertion process, the polygon can be approximated using a minimum bounding rectangle. When a new point is added to R2, the SPATIAL data cartridge can scan the index on R1 to identify all polygons in R1 that contain the newly added point (i.e., the primary filter). The results of the index scan can then be used to perform an exact CONTAINS comparison based on the geometric coordinates of the polygons in the superset and the geometric coordinates of the point, thereby producing an exact result set (i.e., the secondary filter).

Figure 6:
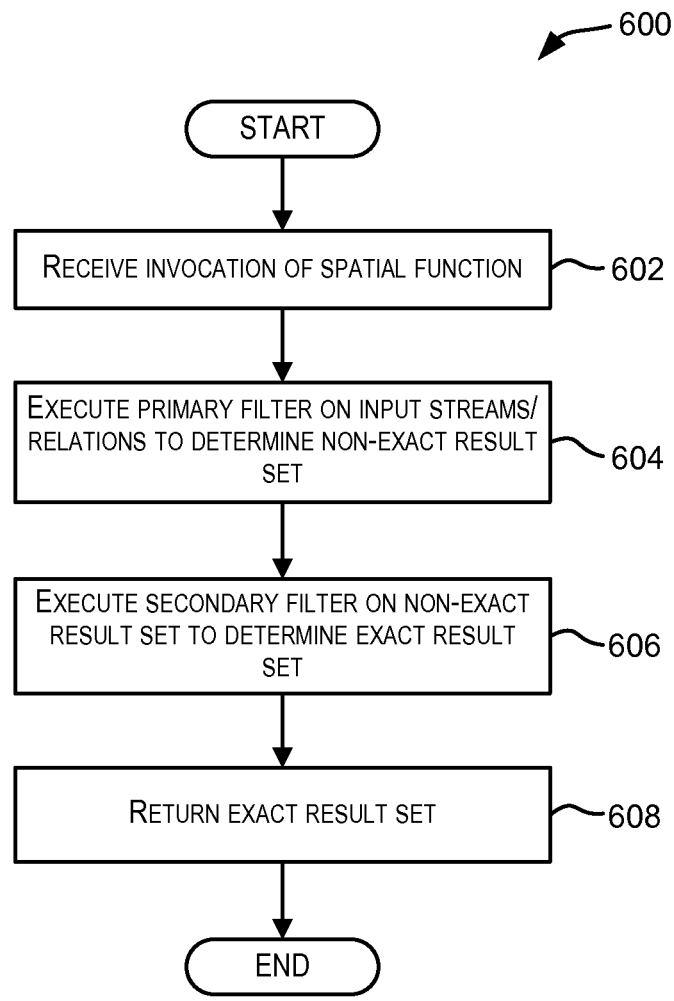
FIG. 6 is a flow diagram of a process performed by a spatial data cartridge for executing a spatial function in a query in accordance with an embodiment of the present invention.

FIG. 6 is a flow diagram of a process 600 performed by a spatial data cartridge for executing a spatial function in a query according to an embodiment of the present invention. Process 600 can be implemented in software, hardware, or a combination of both. As software, process 600 can be stored on a non-transitory computer-readable medium. In a particular embodiment, the spatial data cartridge can correspond to data cartridge 132 depicted in FIGS. 1-3.

At block 602, the spatial data cartridge can receive, from runtime engine 136 of event processing system 102, an invocation of a spatial function implemented in the data cartridge. For example, this invocation can be received in response to a call-out performed by runtime engine 136 during query execution as shown at block 506 of FIG. 5.

At block 604, the spatial data cartridge can execute a primary filter operation on the input arguments to the function (e.g., input streams and/or relations) to determine a non-exact result set for the function. For example, if the function is a geometric CONTAINS function performed on a relation of polygons and a point, the primary filter can determine, based on geometric approximations of the polygons, a group of candidate polygons that is likely contain the point. Note that this group of candidate polygons is a superset of the exact result set for the CONTAINS function, since some of the candidate polygons may not, in fact, contain the point. The purpose of the primary filter is to prune the search space (in this case, the relation of polygons) using a computationally inexpensive operation, so that more expensive geometric comparisons can be subsequently performed on the smaller group of candidate polygons (rather than the entire relation).

As discussed above, in certain embodiments the primary filter can be implemented using a spatial index. For example, a spatial index can be defined for the relation of polygons, where the geometry of each polygon in the index is approximated using, e.g., a minimum bounding rectangle. In this embodiment, executing the primary filter can comprise performing a index scan on the index to identify all polygons that include the point. Since the geometries of the polygons are approximated rather than exact, the result set returned by the index scan will be a superset of the exact result set.

Once the primary filter has been executed, the spatial data cartridge can execute a secondary filter operation on the non-exact results returned by the primary filter, thereby resulting in a exact result for the spatial function (blocks 606. 608). For instance, returning to the example above, executing the secondary filter operation can include performing the CONTAINS operation based on the exact geometric coordinates of the candidate polygons returned by the primary filter, and the geometric coordinates of the point. This yields an exact result set for the CONTAINS function. Although the secondary filter operation (i.e., performing exact geometric comparisons) can be computationally expensive, since it only applied to the primary filter results, the overall cost for executing the spatial function is reduced.

It should be appreciated that process 600 is illustrative and that variations and modifications are possible. Steps described as sequential can be executed in parallel, order of steps can be varied, and steps can be modified, combined, added, or omitted. One of ordinary skill in the art will recognize many variations, modifications, and alternatives.

In one set of embodiments, the spatial data cartridge can specify application context information that is used during runtime processing of spatial queries. For example, when performing spatial data analysis, a specific geometric coordinate system usually needs to be specified. Different spatial data applications can use different coordinate systems. By predefining this type of information in an application context, this information can be accessible to the application when creating new spatial data object instances or invoking spatial functions. This context information can be configured by a developer of the spatial data cartridge and stored in a data file, such as an Event Processing Network (EPN) assembly file.

The following table identifies attributes that can be specified in a spatial application context according to an embodiment of the present invention. Other attributes not listed below can also be supported.

| Attribute | Description |
| --- | --- |
| anyinteract-tolerance | The default tolerance for contain or inside operator. Default: 0.0000005 |
| rof | Defines the Reciprocal of Flattening (ROF) parameter used for buffering and projection. Default: 298.257223563 |
| sma | Defines the Semi-Major axis (SMA) parameter used for buffering and projection. Default: 6378137.0 |
| srid | SRID integer (identifies coordinate system). Valid values are:<br>CARTESIAN: for Cartesian coordinate system.<br>LAT_LNG_WGS84_SRID: for WGS84 coordinate system.<br>An integer value from the Oracle Spatial SDO_COORD_SYS table COORD_SYS_ID column.<br>Default: LAT_LNG_WGS84_SRID |
| Tolerance | The minimum distance to be ignored in geometric operations including buffering. Default: 0.000000001 |

Figure 7:
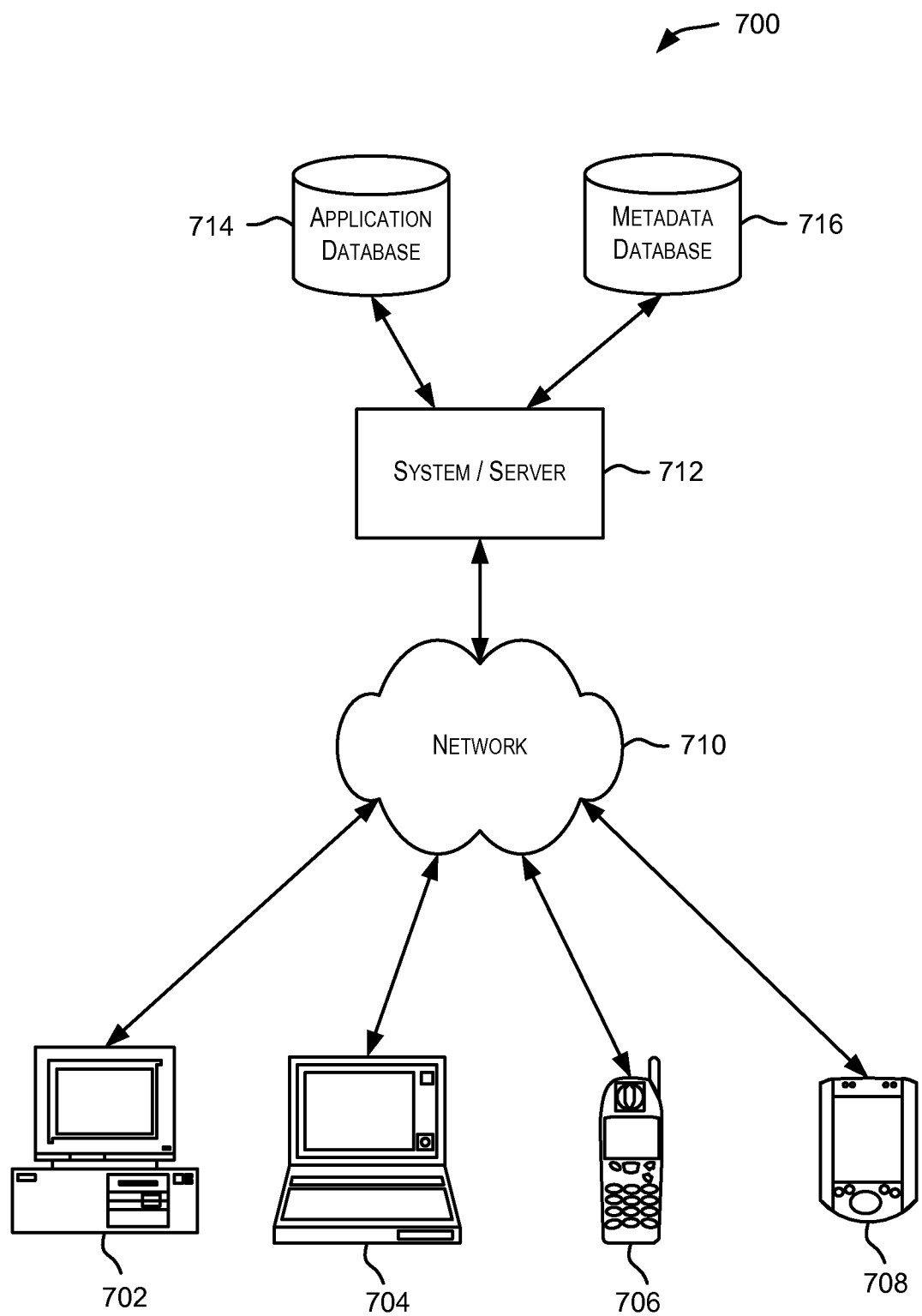
FIG. 7 is a simplified block diagram illustrating components of a system environment that can be used in accordance with an embodiment of the present invention.

FIG. 7 is a simplified block diagram illustrating components of a system environment 700 that can be used in accordance with an embodiment of the present invention. As shown, system environment 700 includes one or more client computing devices 702, 704, 706, 708, which are configured to operate a client application such as a web browser, proprietary client (e.g., Oracle Forms), or the like. In various embodiments, client computing devices 702, 704, 706, and 708 can interact with an event processing system such as system 712.

Client computing devices 702, 704, 706, 708 can be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, and 708 can be any other electronic device, such as a thin-client computer, Internet-enabled gaming system, and/or personal messaging device, capable of communicating over a network (e.g., network 710 described below). Although exemplary system environment 700 is shown with four client computing devices, any number of client computing devices can be supported.

System environment 700 can include a network 710. Network 710 can be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Event processing system 712 can comprise one or more server computers which can be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, system 712 can be adapted to run one or more services or software applications described in the foregoing disclosure.

System 712 can run an operating system including any of those discussed above, as well as any commercially available server operating system. System 712 can also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 700 can also include one or more databases 714 and 716. Databases 714 and 716 can reside in a variety of locations. By way of example, one or more of databases 714 and 716 can reside on a storage medium local to (and/or resident in) system 712. Alternatively, databases 714 and 716 can be remote from system 712, and in communication with system 712 via a network-based or dedicated connection. In one set of embodiments, databases 714 and 716 can reside in a storage-area network (SAN) familiar to those skilled in the art. Similarly, any necessary files for performing the functions attributed to system 712 can be stored locally on system 712 and/or remotely, as appropriate. In one set of embodiments, databases 714 and 716 can include relational databases, such as Oracle 10g, which are adapted to store, update, and retrieve data in response to SQL-formatted commands.

Figure 8:
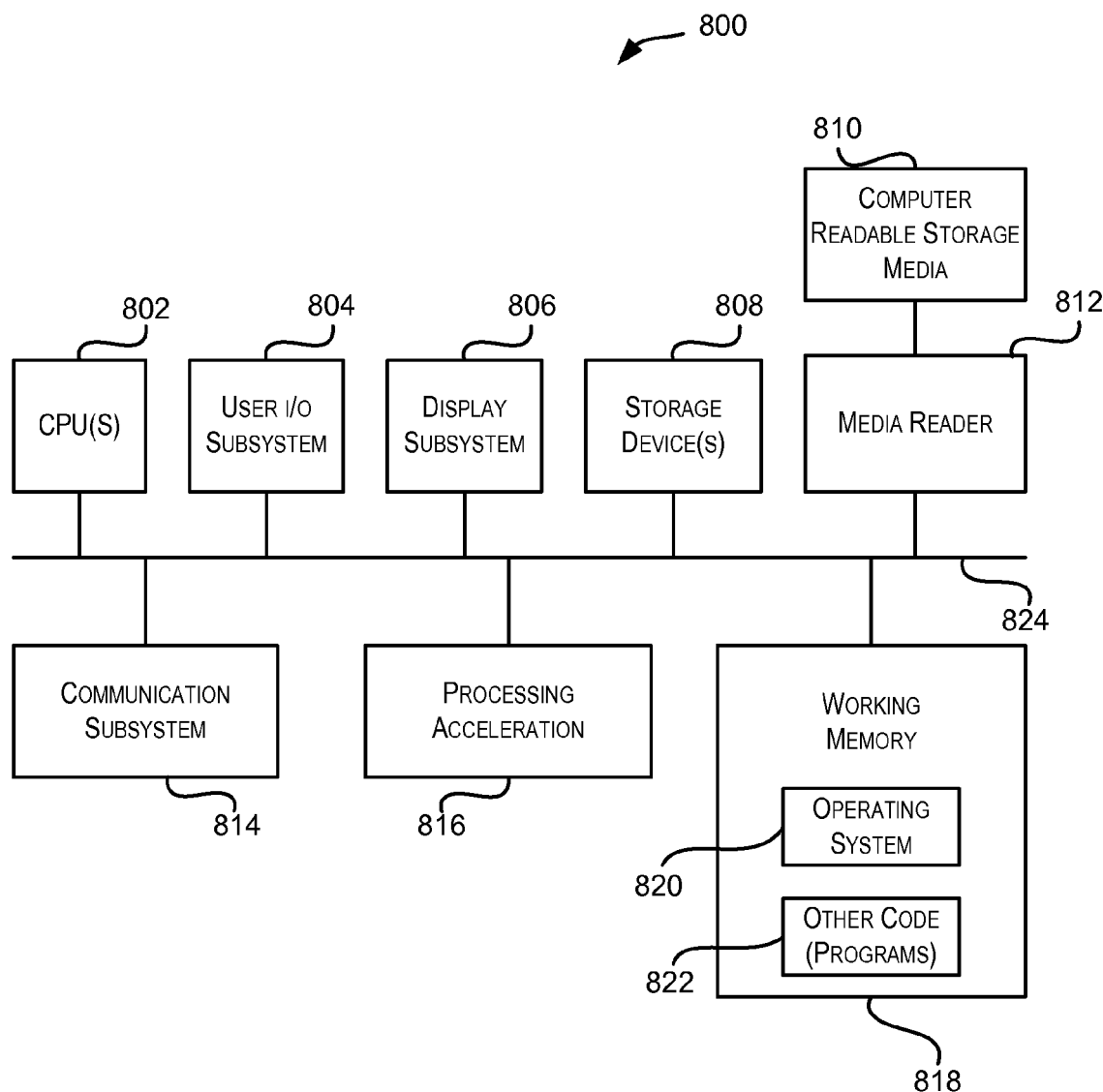
FIG. 8 is a simplified block diagram of a computer system that can be used in accordance with an embodiment of the present invention.

FIG. 8 is a simplified block diagram of a computer system 800 that can be used in accordance with embodiments of the present invention. For example, system 800 can be used to implement event processing system 102 depicted in FIGS. 1 and 3. Computer system 800 is shown comprising hardware elements that can be electrically coupled via a bus 824. The hardware elements can include one or more central processing units (CPUs) 802, one or more input devices 804 (e.g., a mouse, a keyboard, etc.), and one or more output devices 806 (e.g., a display device, a printer, etc.). Computer system 800 can also include one or more storage devices 808. By way of example, the storage device(s) 808 can include devices such as disk drives, optical storage devices, and solid-state storage devices such as a random access memory (RAM) and/or a read-only memory (ROM), which can be programmable, flash-updateable and/or the like.

Computer system 800 can additionally include a computer-readable storage media reader 812, a communications subsystem 814 (e.g., a modem, a network card (wireless or wired), an infra-red communication device, etc.), and working memory 818, which can include RAM and ROM devices as described above. In some embodiments, computer system 800 can also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device (s) 808) comprehensively representing remote, local, fixed, and/or removable storage devices plus storage media for temporarily and/or more permanently containing computer-readable information. Communications subsystem 814 can permit data to be exchanged with network 710 and/or any other computer described above with respect to system environment 700.

Computer system 800 can also comprise software elements, shown as being currently located within working memory 818, including an operating system 820 and/or other code 822, such as an application program (which can be a client application, Web browser, mid-tier application, RDBMS, etc.). In an exemplary embodiment, working memory 818 can include executable code and associated data structures (such as caches) used for processing events and performing data cartridge-related processing as described above. It should be appreciated that alternative embodiments of computer system 800 can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention can be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes can be made thereunto without departing from the broader spirit and scope as set forth in the claims.

What is claimed is:

1. A system comprising:
    a storage component configured to store a spatial data cartridge including metadata pertaining to a spatial function that is not natively supported by the system and code that implements the spatial function, the spatial function being configured to determine a topological relationship between first spatial data and second spatial data; and
    a processor configured to:
        receive a query referencing the spatial data cartridge and the spatial function to be evaluated using the spatial data cartridge, the query being adapted to process one or more data streams;
        compile the query based on the metadata included in the spatial data cartridge, the metadata comprising a list of arguments for evaluating the spatial function using the spatial data cartridge; and
        execute the query based on the code included in the spatial data cartridge;
    wherein the query includes a link definition that specifies the spatial function and the spatial data cartridge;
    wherein the processor is configured to identify the spatial data cartridge based on the link definition;
    wherein the system is an event processing system.

2. A system comprising:
    a storage component configured to store a spatial data cartridge including metadata pertaining to a spatial function that is not natively supported by the system and code that implements the spatial function, the spatial function being configured to determine a topological relationship between first spatial data and second spatial data; and
    a processor configured to:
        receive a query referencing the spatial data cartridge and the spatial function to be evaluated using the spatial data cartridge, the query being adapted to process one or more data streams;
        compile the query based on the metadata included in the spatial data cartridge, the metadata comprising a list of arguments for evaluating the spatial function using the spatial data cartridge; and
        execute the query based on the code included in the spatial data cartridge;
    wherein executing the query comprises executing the code that implements the spatial function in the spatial data cartridge;
    wherein executing the code that implements the spatial function comprises:
        performing a first filter operation with respect to data in a first spatial data stream and data in a second spatial data stream, the first filter operation returning a superset of an exact result set for the spatial function; and
        performing a second filter operation with respect to the superset, the second filter operation returning the exact result set for the spatial function.

3. The system of claim 2 wherein performing the first filter operation comprises:

comparing geometric approximations of the data in the first spatial data stream and the data in the second spatial data stream; and determining likely topological relationships between the data in the first spatial data stream and the data in the second spatial data stream based on the comparing.

4. The system of claim 2 wherein performing the second filter operation comprises:

comparing exact geometries of the data in the first spatial data stream and the data in the second spatial data stream; and determining exact topological relationships between the data in the first spatial data stream and the data in the second spatial data stream based on the comparing.

5. The system of claim 2 wherein performing the first filter operation comprises performing an index scan of a spatial index created for the first spatial data stream or the second spatial data stream.

6. A non-transitory computer-readable storage medium having stored thereon instructions executable by a processor, the instructions comprising:

instructions that cause the processor to register a spatial data cartridge including metadata pertaining to a spatial function that is not natively supported by the system and code that implements the spatial function, the spatial function being configured to determine a topological relationship between first spatial data and second spatial data;

instructions that cause the processor to receive a query containing a link definition that references both the spatial function to be evaluated using the spatial data cartridge and the spatial data cartridge, the query being adapted to process one or more data streams;

instructions that cause the processor to identify the spatial data cartridge based on the link definition;

instructions that cause the processor to compile the query based on the metadata included in the spatial data cartridge, the metadata comprising a list of arguments for evaluating the spatial function using the spatial data cartridge; and instructions that cause the processor to execute the query based on the code included in the spatial data cartridge;

wherein the instructions that cause the processor to execute the query comprise instructions that cause the processor to execute the code that implements the spatial function in the spatial data cartridge.

7. The non-transitory computer-readable storage medium of claim 6 wherein the instructions that cause the processor to execute the code that implements the spatial function comprises:

instructions that cause the processor to perform a first filter operation with respect to data in a first spatial data stream and data in a second spatial data stream, the first filter operation returning a superset of an exact result set for the spatial function; and instructions that cause the processor to perform a second filter operation with respect to the superset, the second filter operation returning the exact result set for the spatial function.

* * * * *